United States Patent [19]

Nusbaum et al.

[11] Patent Number: 5,112,183

[45] Date of Patent: May 12, 1992

[54] SIDE-LOADING FORK LIFT VEHICLE

[75] Inventors: Howard G. Nusbaum, 53 Heritage La., Stamford, Conn. 06903; James A. Bevan, Ottumwa, Iowa

[73] Assignee: Howard G. Nusbaum, Stamford, Conn.

[21] Appl. No.: 660,777

[22] Filed: Feb. 25, 1991

Related U.S. Application Data

[63] Continuation-in-part of Ser. No. 342,999, Apr. 25, 1989, Pat. No. 4,995,774.

[51] Int. Cl.$^5$ .............................. B62D 1/00; B66F 9/00
[52] U.S. Cl. ............................ 414/544; 180/234; 280/91; 280/43.24; 414/282; 414/541; 414/635; 414/665
[58] Field of Search ............... 414/281, 282, 495, 540, 414/541, 544, 595, 631, 634, 635, 663, 664, 665; 180/140, 233, 234, 236, 242; 280/43.23, 43.24, 91

[56] References Cited

U.S. PATENT DOCUMENTS

| | | | |
|---|---|---|---|
| 2,621,811 | 12/1952 | Lull | 414/544 |
| 2,829,785 | 4/1958 | Pitts | 414/541 |
| 3,067,839 | 12/1962 | Gibson | 280/91 X |
| 3,087,564 | 4/1963 | Quayle et al. | 280/91 X |
| 3,090,516 | 5/1963 | Seymour et al. | 280/91 X |
| 3,168,956 | 2/1965 | Jinks et al. | 414/544 |
| 3,197,229 | 7/1965 | Houlton | 280/91 |
| 3,198,541 | 8/1965 | Christenson et al. | 280/91 |
| 3,556,241 | 1/1971 | Mitchell et al. | 280/91 X |
| 3,595,409 | 7/1971 | Bowman-Shaw | 414/544 |
| 3,756,437 | 9/1973 | Bowman-Shaw | 414/544 |
| 3,958,703 | 5/1976 | Marco et al. | 414/544 |
| 4,119,210 | 10/1978 | Desourdy | 414/495 X |
| 4,249,850 | 2/1981 | Van Doorn et al. | 414/495 X |
| 4,339,139 | 7/1982 | Swanson | 280/43.23 |
| 4,408,739 | 10/1983 | Buchsel | 414/495 X |
| 4,446,941 | 5/1984 | Laurich-Tost | 180/236 |
| 4,664,399 | 5/1987 | Mobley et al. | 414/495 X |
| 4,821,806 | 4/1989 | Winter | 280/43.23 X |
| 4,823,899 | 4/1989 | Ron | 180/236 X |
| 5,018,593 | 5/1991 | Hermann | 280/43.23 X |

FOREIGN PATENT DOCUMENTS

| | | | |
|---|---|---|---|
| 1019969 | 11/1957 | Fed. Rep. of Germany | 414/544 |
| 1209898 | 1/1966 | Fed. Rep. of Germany | 414/544 |
| 2103484 | 1/1970 | Fed. Rep. of Germany | 414/544 |
| 2105279 | 1/1970 | Fed. Rep. of Germany | 414/544 |
| 1924223 | 6/1970 | Fed. Rep. of Germany | 414/544 |
| 1946757 | 3/1971 | Fed. Rep. of Germany | 414/544 |
| 1950633 | 4/1971 | Fed. Rep. of Germany | 414/544 |
| 1953112 | 4/1971 | Fed. Rep. of Germany | 414/544 |
| 2314855 | 6/1975 | France | 280/43.24 |
| 820782 | 9/1959 | United Kingdom | 414/544 |

*Primary Examiner*—Robert J. Spar
*Assistant Examiner*—Robert S. Katz
*Attorney, Agent, or Firm*—Gottlieb, Rackman & Reisman

[57] ABSTRACT

A side-loading all-terrain fork lift vehicle for handling heavy loads which are long relative to their width, e.g., junked cars, in a storage facility having multi-level racks separated by narrow aisles and with restricted vertical clearance between levels. The vehicle body has an elongated load-carrying frame section which includes a longitudinal torsion beam at one side, two transverse torsion beams at its front and rear ends, two transverse medial beams defining a guideway for the mast-carrying trolley, and cross-brace beams between the torsion beams and the medial beams. The front and rear wheel axles are supported by respective rocker frames pivotally mounted on the associated transverse torsion beams and adapted to be angularly moved up and down by respective hydraulic piston and cylinder units which enable the frame section to be lowered so as to rest on the ground during on-loading and off-loading for maximum stability of the vehicle. Optionally, the fork arms can be extended a bit further after the trolley has reached the limit of its outward movement along its guideway, and they can also be shifted slightly to either side if they are not properly aligned with a compartment in the rack.

19 Claims, 12 Drawing Sheets

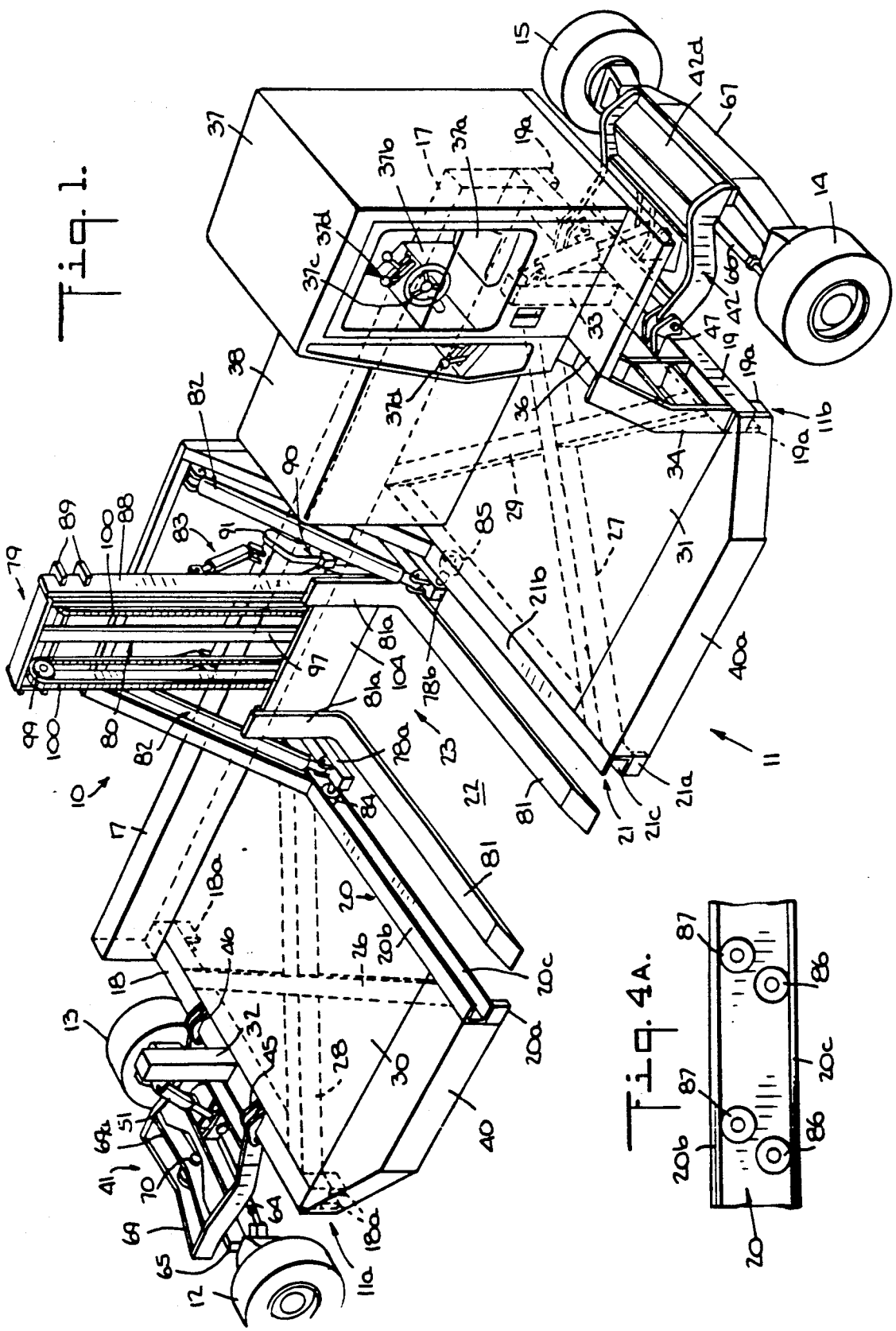

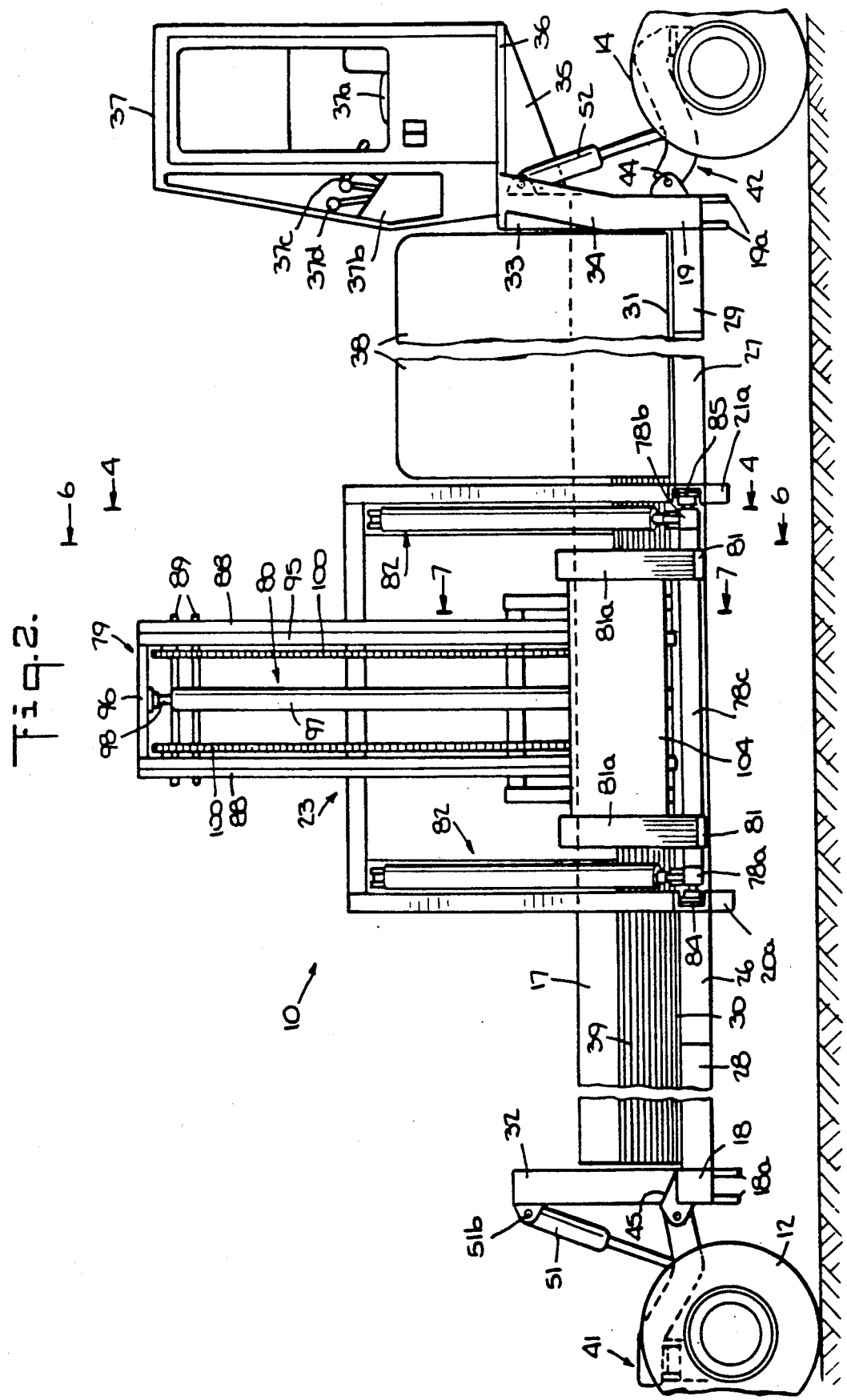

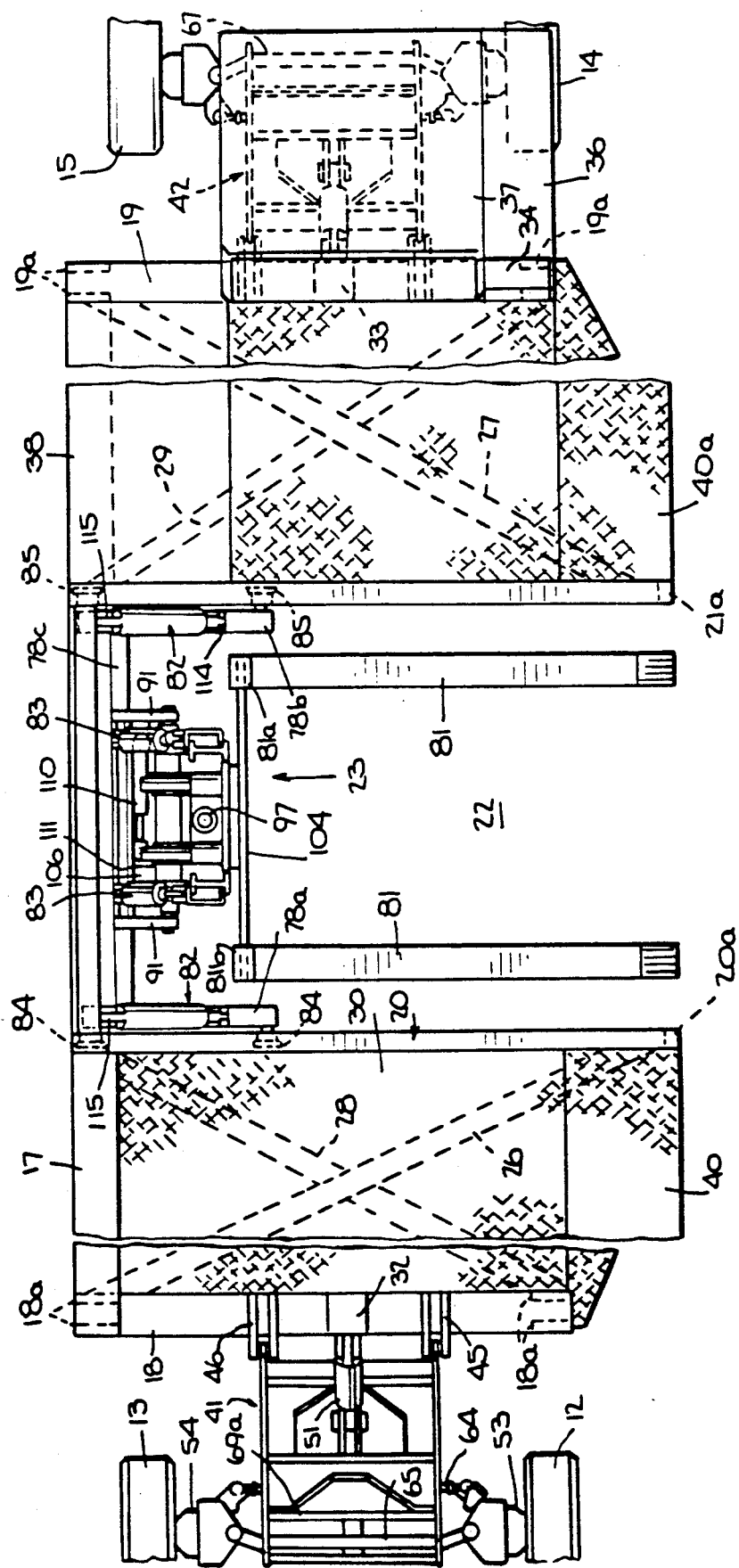

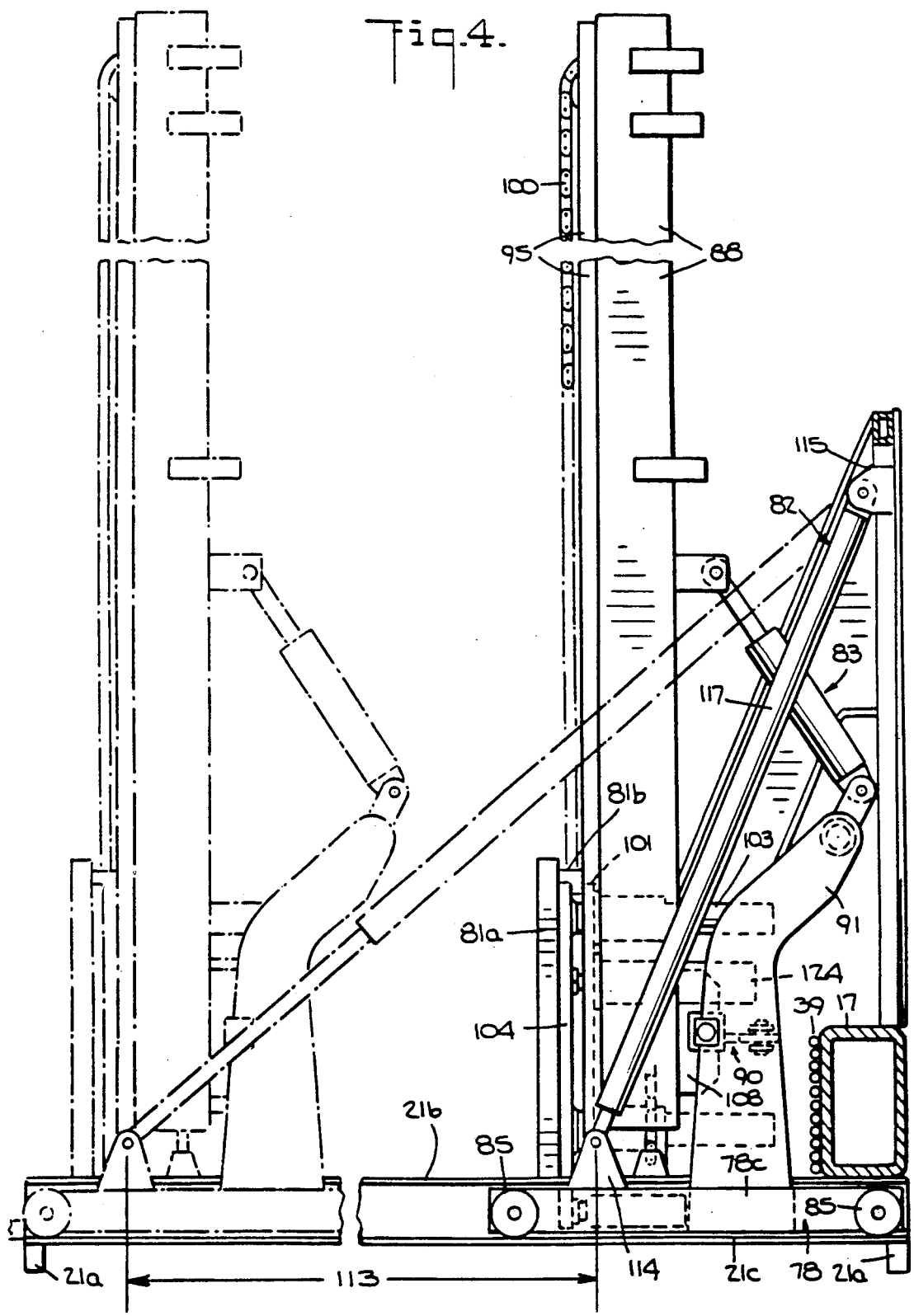

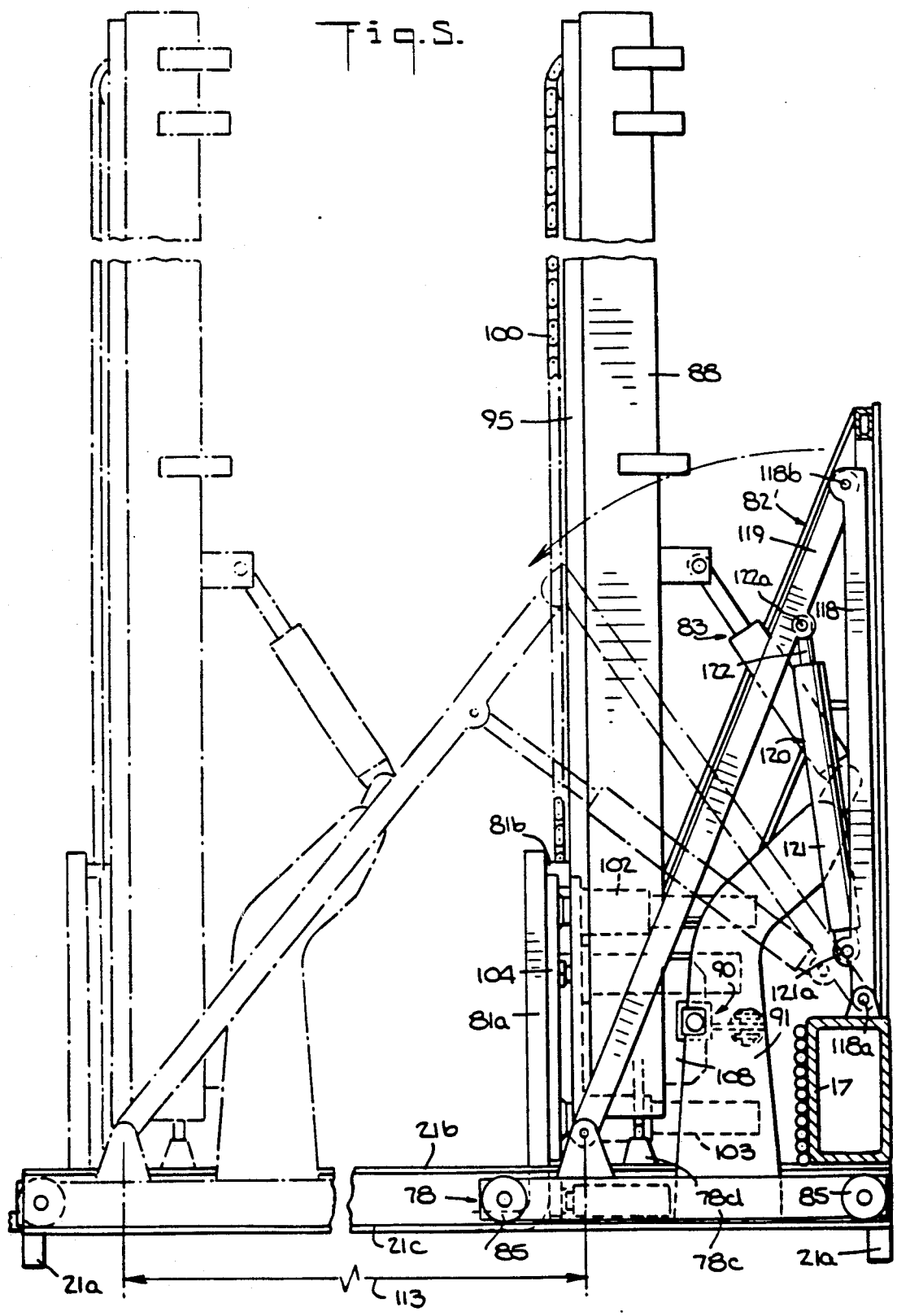

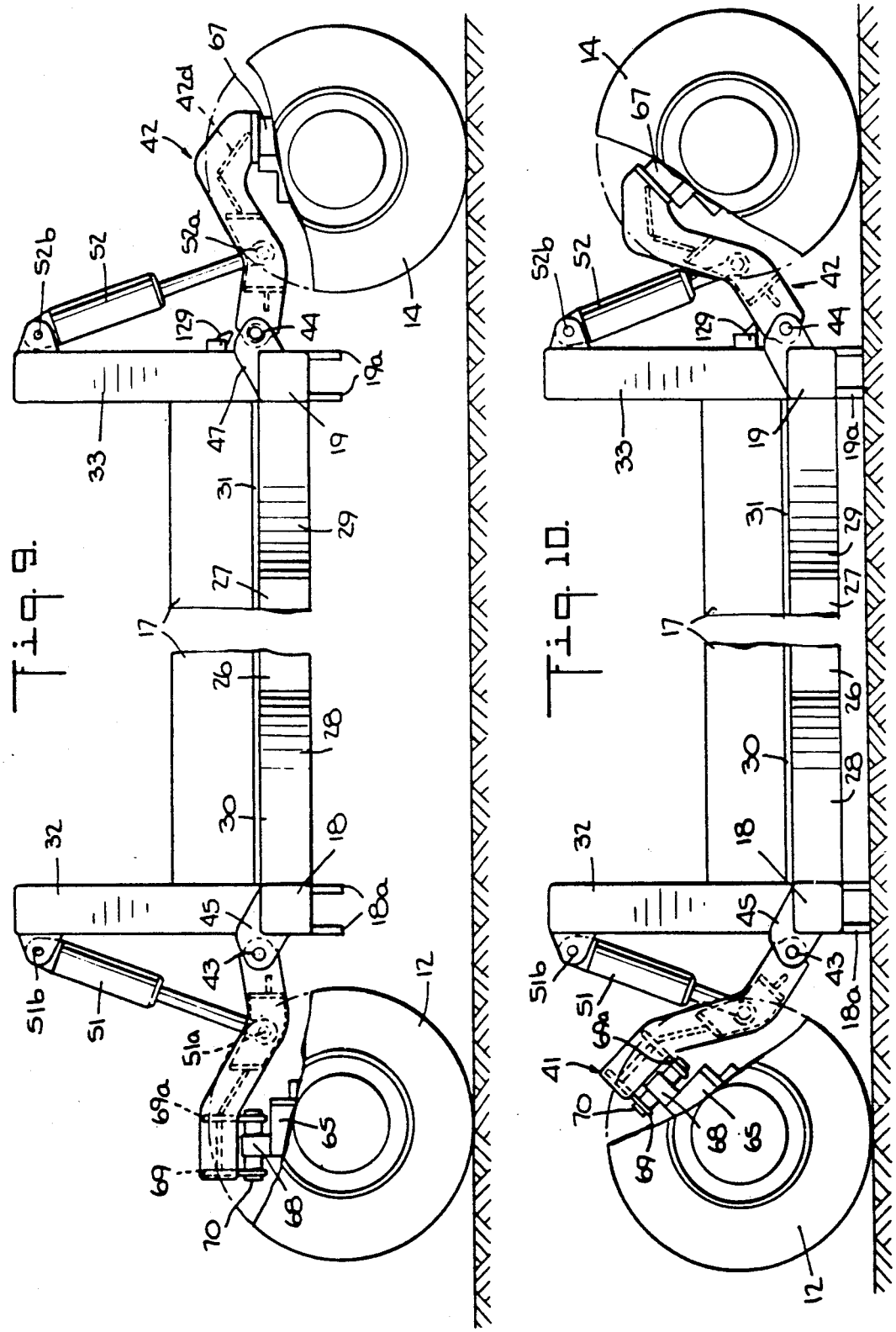

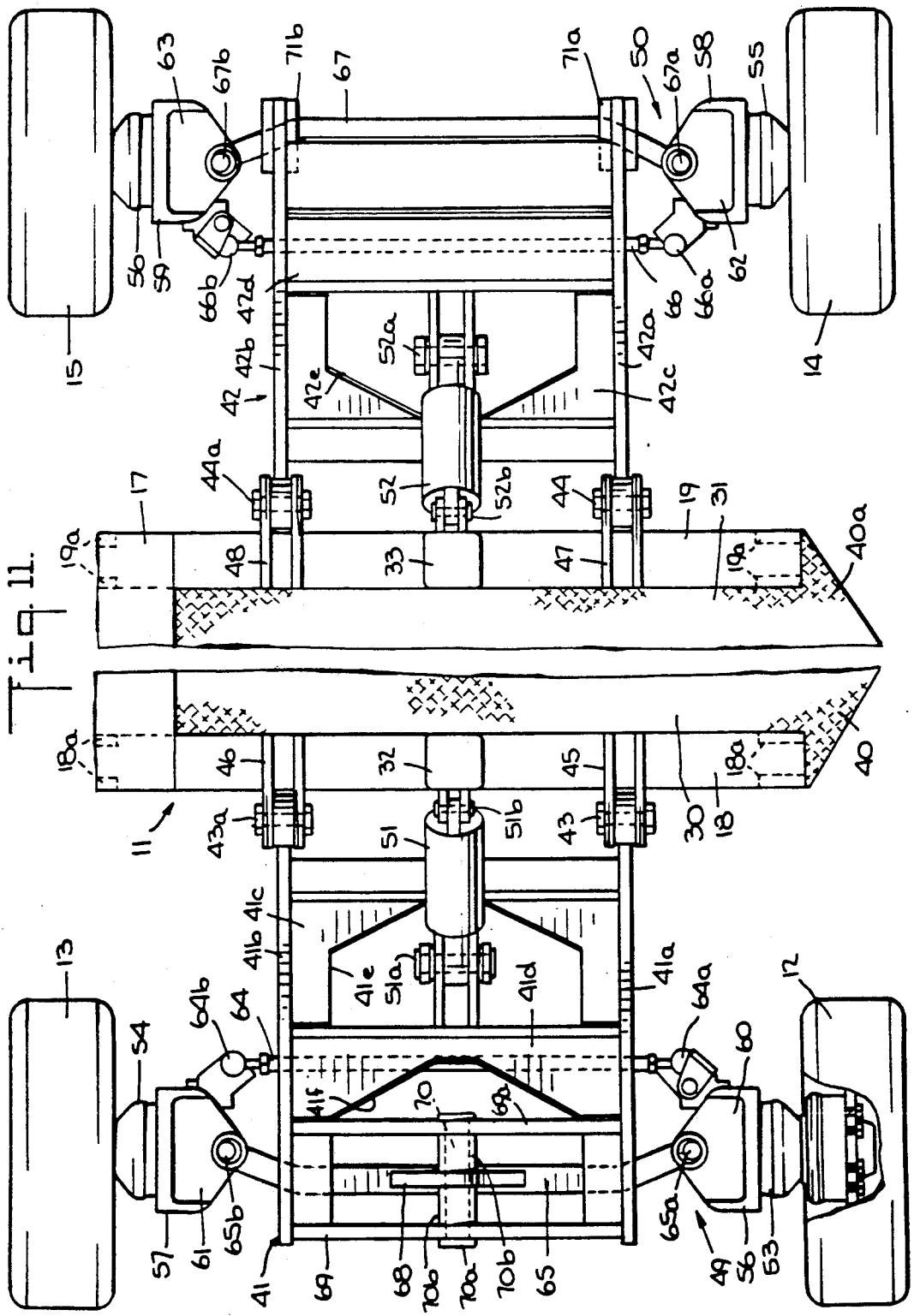

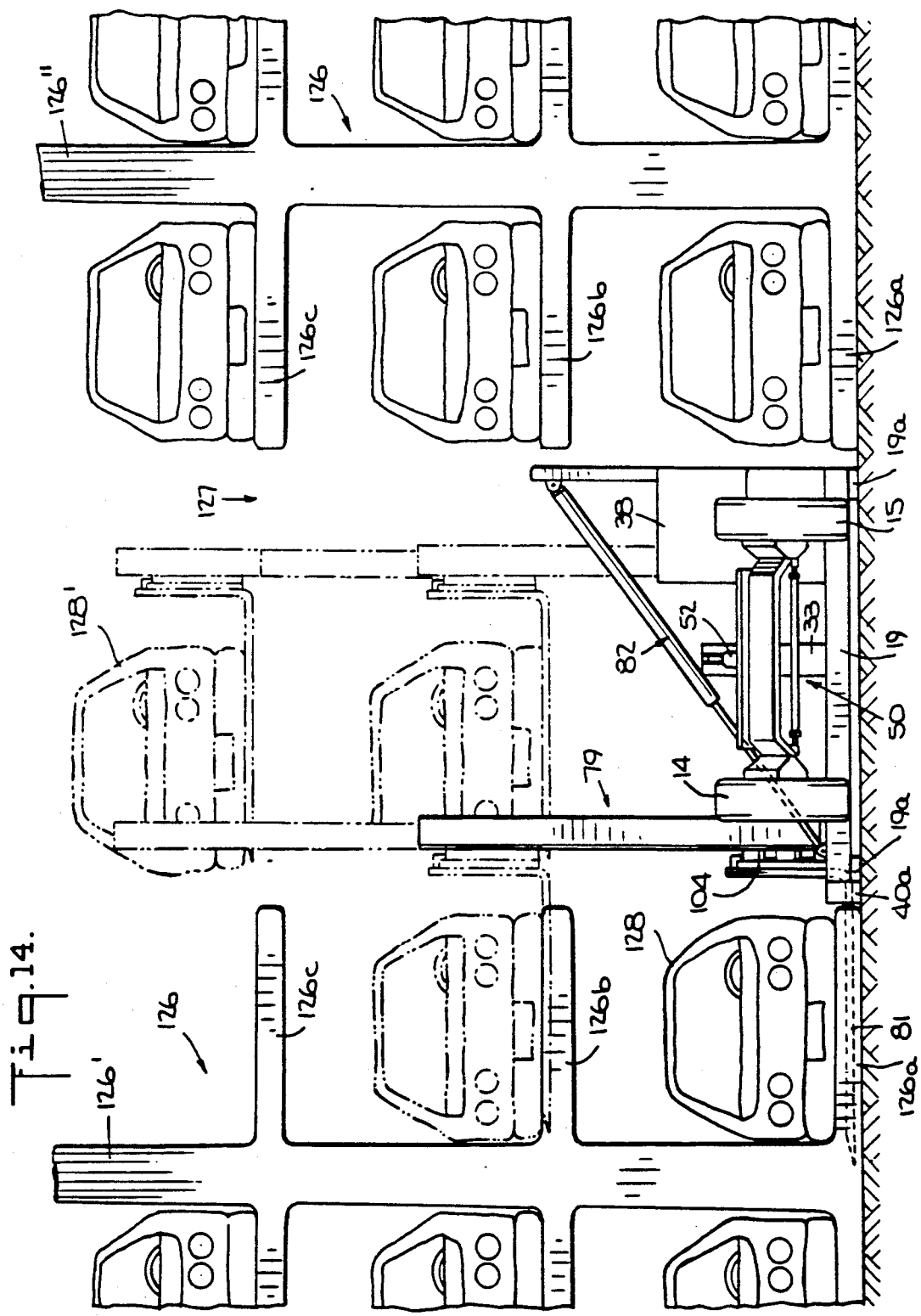

SIDE-LOADING FORK LIFT VEHICLE

CROSS-REFERENCE TO RELATED APPLICATION

This application is a continuation-in-part of prior application Ser. No. 342,999 filed Apr. 25, 1989, now U.S. Pat. No. 4,995,774 by Howard G. Nusbaum.

INTRODUCTION

This invention relates to fork lift vehicles, and in particular to a side-loading fork lift vehicle for handling heavy loads which are long relative to their widths.

Although the present invention is believed to be of wide ranging utility, it will be described herein in the first instance as applied to the handling of junked cars in a storage facility therefor.

BACKGROUND OF THE INVENTION

Side-loading fork lift vehicles (sometimes also referred to as "fork lift trucks") have been well known for many years. See, for example, Hegarty U.S. Pat. No. 2,591,544; Lull U.S. Pat. No. 2,621,811; Erickson et al. U.S. Pat. No. 3,031,091; Quayle U.S. Pat. No. 3,167,201; Jinks et al. U.S. Pat. No. 3,168,956, and numerous others. Such vehicles lend themselves readily to handling loads which are stored or to be stored in multi-level stacks or racks separated by narrow aisles and having relatively restricted vertical clearance between levels, and by virtue of their structural and operating characteristics enable more of the available ground space of the storage facility to be profitably occupied by the stored loads and less of the ground space to be wasted in unoccupied wide aisles between the stacks or racks.

Such an optimization of storage space vs. aisle space utilization is especially important in an automotive junk yard because of the fact that junked or wrecked cars, which have to be stored in multi-level racks, are not only long relative to their width but are also exceedingly bulky. Prior to the invention described and claimed in the aforesaid application Ser. No. 342,999, however, the operation of such automotive junk yards had been a rather uneconomical undertaking because of the need to leave large aisles between adjacent racks to accommodate the relatively great maneuvering room required by the conventionally used front-loading fork lift trucks for removing cars from or placing them into the racks. Thus, the number of cars that could be stored in any given facility was likewise limited, which, with land values and labor costs continuously on the rise, put a severe strain on the profitability of the storage facility.

The side-loading fork lift trucks known prior to the development of the vehicle according to the invention described and claimed in application Ser. No. 342,999, as far as the present inventors are aware, had not been used in the storage of junked or wrecked cars and had not been suited for such use, even when designed for lifting relatively long loads such as pipes and timbers. In particular, such side-loading fork lift trucks have a very limited capability in terms of the height to which they can elevate a load, usually not more than about 12 feet (3.66 meters) off the ground. Moreover, as the above-cited representative patents make clear, in the known side-loading fork lift trucks the problems being dealt with have generally been one or another of the individual problems of counter-balancing the load, vehicle stability, load distribution between the wheels of the vehicle, or the like. Also, the known side-loading fork lift vehicles have generally been relatively short, and thus maneuverability problems have not arisen in connection therewith or been insuperable. However, it appears that none of the prior art patents has ever dealt with the totality of the vehicle operation.

BRIEF DESCRIPTION OF THE INVENTION

It is an object of the present invention, therefore, to provide a side-loading fork lift vehicle which is suited for handling relatively long and narrow bulky loads such as junked or wrecked cars and which not only avoids the drawbacks and the disadvantages of the known side-loading fork lift vehicles but is an improvement of the fork lift vehicle disclosed in the aforesaid application Ser. No. 342,999.

It is another object of the present invention to provide a novel and improved side-loading fork lift vehicle which is considerably longer than known fork lift vehicles of this class but is nevertheless highly maneuverable both in forward and reverse even in narrow aisles and on erose terrain, which is extremely stable during on-loading and off-loading as well as when in motion, which can shift a load such as a junked or wrecked car from a limited clearance storage rack space at ground level directly into the vehicle and onto the load-carrying frame thereof, and vice versa, without having to raise the fork arms off ground level, and which is capable of manipulating such loads to and at heights of as much as 30-35 feet (9.14-10.67 meters) above ground level.

Generally speaking, the basic objectives of the present invention are attained by means of a side-loading fork lift vehicle which is characterized by the following features:

a. The vehicle has an elongated vehicle body with front and rear ends and opposite sides. The vehicle body is constructed of an elongated load-carrying frame section which includes (i) first torsion beam means extending longitudinally of the vehicle body at a first side and from the front end to the rear end thereof, (ii) second and third torsion beam means located at the front end and the rear end of the vehicle body, respectively, and each extending from the first side of the vehicle body to the second side of the latter, with each of the second and third torsion beam means being rigidly affixed at a first end of the same to the first torsion beam means at the first side of the vehicle body and having a second end located substantially at the second side of the vehicle body, (iii) a pair of parallel transverse beam means located in the midregion of the frame section and defining a first space therebetween, with each of the transverse beam means being rigidly affixed at a first end of the same to the first torsion beam means at the first side of the vehicle body and having a second end located substantially at the second side of the vehicle body, and the transverse beam means being separated by respective second and third spaces from the second and third torsion beam means, and (iv) respective cross-brace means located in the second and third spaces, with each cross-brace means being rigidly affixed to the associated one of the second and third torsion beam means and the proximate one of the transverse beam means.

b. The vehicle running gear includes front axle means supporting a pair of front ground wheels, rear axle means supporting a pair of rear ground wheels. front rocker frame means pivotally connected to the second torsion beam means for angular up and down movement about a first axis parallel to the latter and supporting the front axle means at a position spaced from and located frontwardly of the second torsion beam means, rear rocker frame means pivotally connected to the third torsion beam means for angular up and down movement about a second axis parallel to the latter and supporting the rear axle means at a position spaced from and located rearwardly of the third torsion beams means, and front and rear hydraulic piston and cylinder units articulated each between a respective one of the second and third torsion beam means and the associated one of the front and rear rocker frame means, the hydraulic piston and cylinder units being operable to elevate the load-carrying frame section relative to the wheels and away from the ground when the vehicle is to be in motion and being operable to lower the load-carrying frame section relative to the wheels and bring it to rest on the ground when the vehicle is to be stationary during an on-loading or off-loading operation.

c. Respective motor means are provided for driving the front and rear ground wheels in forward and reverse, along with means for controlling the orientations of the front and rear ground wheels through respective arcs to either the left or the right relative to the longitudinal axis of the vehicle body for enabling movement of the vehicle at least in either a straight ahead mode or a radius turning mode or optionally even in a crabwise mode in either the forward or the reverse direction.

d. Guideway means are provided on the transverse beam means and extend along the latter, a trolley is mounted on the guideway means between the transverse beam means for reciprocal movement therealong, and first hydraulic piston and cylinder means are operatively interconnected between the load-carrying frame section and the trolley for reciprocally moving the latter along the guideway means.

e. Load-handling means are arranged on the trolley and include a vertical framework carried by the trolley, and mast means are mounted in the framework for vertical up and down movement relative thereto. Second hydraulic piston and cylinder means are operatively interconnected between the trolley and the mast means for moving the latter up and down relative to the framework and the trolley, and a plurality of fork arms are carried by the mast means and extend therefrom in a direction away from the first side of the vehicle body, the fork arms being adapted, upon an appropriate movement of the trolley, to be retracted to a position within the confines of the load-carrying frame section or protracted to a position outside the confines of the load-carrying frame section beyond the second side of the vehicle body at any elevation of the mast means, even at ground level.

f. An operator's cab is mounted on the vehicle body, the cab being supported by the torsion beam means at an elevation above the level of the load-carrying frame section.

The side-loading fork lift vehicle according to the present invention, though it has an overall length in excess of 27 feet (8.23 meters) and an overall width in excess of 9 feet (2.74 meters), is characterized by great stability in all operational stages thereof, i.e., while stationary during on-loading and off-loading and while in motion during transfer of a junked car from one location to another, and by great maneuverability both in open spaces and in narrow aisles between storage racks of a junked car storage facility. Moreover, by virtue of the construction and low height of its load-carrying frame section, the vehicle is adapted to pick up a junked car from ground level and shift it onto the platform within the confines of the vehicle, or vice versa, without the fork arms having to be elevated from the ground more than just the minimum required for the wheels or tires of the car to clear to ground and the platform.

BRIEF DESCRIPTION OF THE DRAWINGS

The foregoing and other objects, characteristics and advantages of the present invention will be more clearly understood from the following detailed description of the same when read in conjunction with the accompanying drawings, in which:

FIG. 1 is a perspective view of the side-loading fork lift vehicle according to the basic embodiment of the present invention as seen from the on-load/off-load side thereof and shows the load-carrying frame section of the vehicle including the longitudinal and transverse torsion beams, the wheels and their axle means and the rocker frames therefor, the operator's cab and the motor housing, the mast and fork arms, and the counterweights attached to the frame section;

FIG. 2 is a side elevational view of the vehicle shown in FIG. 1 but with the counterweights omitted, the view being taken from the on-load/off-load side of the vehicle;

FIG. 3 is a top plan view of the vehicle shown in FIG. 2 but with the counterweights included;

FIG. 4 is an elevational view, taken along the line 4—4 in FIG. 2, of a piston and cylinder mechanism connected directly between the load-carrying frame section and the mast-carrying trolley for moving the latter back and forth along the guideway therefor constituted by the transverse medial beam means of the load-carrying frame section;

FIG. 4A is a fragmentary elevational view of one of the guide tracks for the trolley and illustrates a modified roller arrangement riding therein which is of the type shown in the aforesaid prior application Ser. No. 342,999;

FIG. 5 is a view similar to FIG. 4 but shows a piston and cylinder operated scissors-type linkage mechanism for moving the trolley along its guideway;

FIG. 7A is a view similar to FIG. 7 but shows the fork arms in the outwardly shifted position thereof relative to the trolley;

FIGS. 9 and 10 are enlarged fragmentary side elevational views of the vehicle and its ground wheel arrangements, with some parts being broken away to show interior details and the counterweights omitted, FIG. 9 showing the vehicle body elevated off the ground and in condition for normal movement, and FIG. 10 showing the vehicle body lowered to rest on the ground and in condition for on-loading/off-loading or for changing/repairing a tire or a wheel;

FIG. 11 is a fragmentary top plan view of the vehicle body shown in FIGS. 9 and 10;

FIG. 14 is a diagrammatic end elevational view of the fork lift vehicle according to the present invention in an aisle between two car body-supporting racks of a junked car storage facility and illustrates the different stages of a transfer of such a car body from one level of the rack to another.

DETAILED DESCRIPTION OF THE INVENTION

Figure 1A:
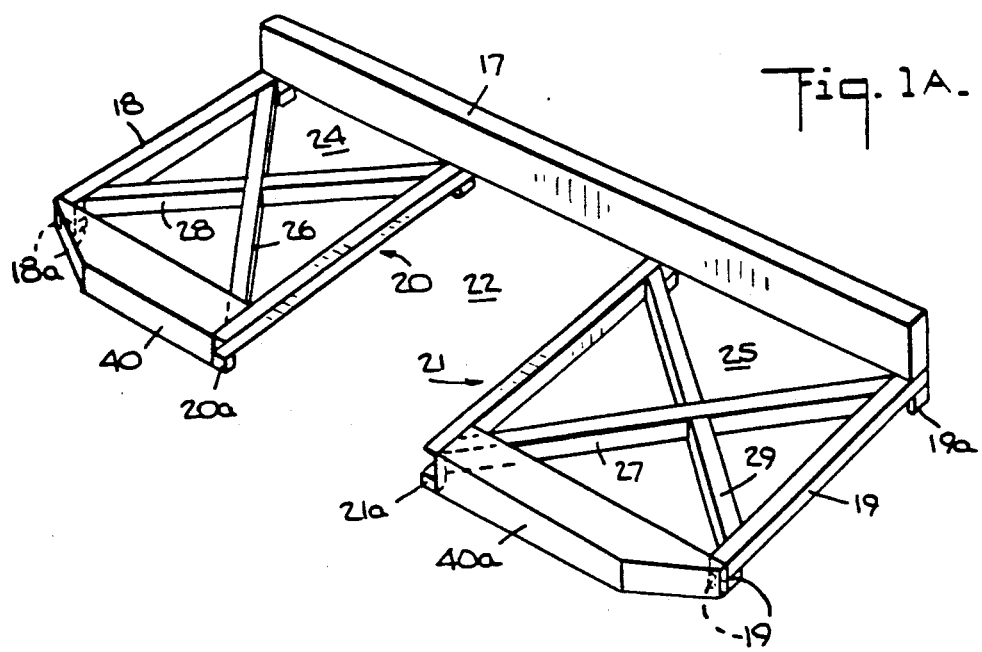
FIG. 1A is a similar perspective view of only the load-carrying frame section of the vehicle shown in FIG. 1.

Referring now to the drawings in greater detail, the side-loading fork lift vehicle 10 according to the present invention (FIGS. 1, 2 and 3) has an elongated vehicle body 11 which is mounted, as will be more fully explained hereinafter, on two sets of ground wheels 12, 13 and 14, 15 at its front end 11a and rear end 11b. The wheels 12-15 are equipped with conventional semi-solid industrial tires, i.e., tires which are both internally air pressurized and filled with a resilient foam, such as are commonly used in fork lift trucks.

Intermediate its front and rear ends, the vehicle body includes (see FIGS. 1 and 1A) a rigid load-carrying frame section 16 which includes longitudinal first torsion beam means consisting of a full-length torsion beam 17 at one side of the vehicle body, second and third torsion beam means consisting of respective torsion beams 18 and 19 extending laterally of the torsion beam 17 at the front and rear ends of the frame section 16, with each of the beams 18 and 19 being rigidly affixed, as by welding, at one end thereof to the longitudinal torsion beam at one side of the vehicle body 11 and having its other end located substantially at the other side of the vehicle body. The frame section 16 further includes a pair of spaced, parallel transverse beams 20 and 21 in the midregion of the frame section, the transverse beams 20 and 21 also being rigidly affixed at one end of each to the torsion beam 17 at one side of the vehicle body and having their other ends located substantially at the other side of the vehicle body, with the space 22 between the beams 20 and 21 being designed to accommodate the load-transferring mechanism 23 of the vehicle 10, as will be more fully described hereinafter. Welded to the bottom surfaces of each of the beams 18-21 at the opposite ends thereof are respective sets of feet 18a, 19a, 20a and 21a, consisting, for example, of single or paired blocks of high strength steel, the purpose of which will become clear as the description proceeds.

Arranged in the spaces 24 and 25 defined between the beams 20 and 21 and the respective proximate lateral torsion beams 18 and 19 are cross-brace means each constituted, for example, by a unitary diagonal beam 26 or 27 and a crossing two-section diagonal beam 28 or 29, the sections of each of the latter being welded at their proximate ends to the associated beams 26 or 27, and the assembled cross-brace beams at their distal ends being welded to the associated beams 18 and 20 or 19 and 21. Additionally, for the sake of safety of workmen, as well as to provide solid platform surfaces to support the wheels of junked cars which are being transported by the vehicle 10 and thereby to prevent the wheels of such cars from entering into the spaces 24 and 25 and either coming into contact with the ground during movement of the vehicle or interfering with an off-loading of such cars especially at ground level, heavy steel plates 30 and 31 are laid over the spaces 24 and 25 and welded in place to the torsion beams and 19 and the transverse medial beams 20 and 21, and, if desired, also to the cross-brace beams 26, 28 and 27, 29.

Although the torsion the beams 17, 18 and 19 may have any desired structural configurations, in the illustrated embodiment of the present invention they are preferably hollow steel box beams. In particular, the length of the main torsion beam 17 is 20 feet and 2 inches (6.15 meters), its rectangular cross-sectional size is 12 inches by 8 inches (30.5 cm by 20.3 cm), and its wall thickness is 0.5 inch (1.27 cm), while the length of each of the lateral torsion beams is 92 inches (2.34 meters), its square cross-sectional size is 7 inches by 7 inches (17.8 cm by 17.8 cm), and its wall thickness is 0.375 inch (0.95 cm). On the other hand, the length of each of the transverse medial beams 20 and 21 which, in light of their function (to be more fully described hereinafter) as guideway means for the mast-carrying trolley of the vehicle 10, are constructed as channel beams, is 9 feet and 10 inches (2.99 meters) so as to ensure that the car-supporting platform of the vehicle will be wide enough to accommodate even large-body cars. The cross-brace beams 26-28, which are only schematically represented in FIGS. 1 and 1A, may be of any suitable construction, e.g., I-beams, box beams, channel beams, or the like.

Rigidly affixed, as by welding, to the midregions of the two lateral torsion beams 18 and 19 at the front and rear ends of the frame section 16 are vertical upright posts 32 and 33 which preferably also are box beams. As best shown in FIG. 2, the post 33 in conjunction with an arrangement of struts 34 and braces 35 (not fully illustrated in the drawings and not necessary to describe in detail) serves to support a platform 36 on which an operator's cab 37 is disposed. In the illustrated embodiment of the invention, the operator's cab includes a seat 37a and a control console 37b providing a steering wheel 37c and a set of control levers 37d for the operation of the various hydraulic and electrical systems of the vehicle, with the motor and the devices for actuating the hydraulic and electrical systems being disposed in a housing 38 located just forward of the operator's cab and adjacent the longitudinal torsion beam 17. The hydraulic and electrical connections between the motor and control housing 38 and the individual systems are effected through a series of pipes and wiring ducts 39 (shown in part and in a purely diagrammatic fashion in FIG. 2 but not in FIGS. 1 and 3) which are in the main supported by the longitudinal torsion beam 17 on the inside face thereof. Suitable counterweights 40 and 40a, in the form of heavy metal plates, are rigidly affixed, as by welding, to the lateral torsion beams 18 and 19 and the associated transverse medial beams 20 and 21 to balance the weight of the motor and control devices in the housing 38, the weight of the longitudinal torsion beam 17 and its adjuncts, and the weight of the mast means when the same and its trolley along with its fork arms are retracted into the confines of the vehicle.

It will be understood, of course, that the illustrated operator's cab arrangement is representative only. For example, the steering wheel column may be tiltably mounted (not shown) in the floor of the cab and the operator's seat may be positioned somewhat further back therefrom. With such an arrangement, the operator would run the vehicle while in a seated position, during which time the steering wheel would be tilted downwardly and closer to him. When desiring to perform an on-loading or off-loading operation, the operator would then tilt the steering wheel up and away from him and would assume a standing position, for which purpose the console 37b for the control levers 37d will advantageously be arranged at one side of the cab (not shown) rather than at the front. In either case, however, the cab 37 (or at the very least the working position of the operator in the cab) is generally centered with respect to the longitudinal axis of the vehicle so as to provide the operator with a clear view of the location of the two sides of the vehicle at all times, thereby to enable him to maneuver the vehicle accurately into and through a narrow aisle between adjacent storage racks and to have a clear view of the on-loading and off-loading operations. Thus, this disposition of the operator's cab gives the operator excellent control over the movements of the vehicle and makes it safe to operate the vehicle in aisles which are as narrow as possible, i.e., only about a foot or so (30-35 cm) wider than the maximum width of the Vehicle.

The vehicle body 11, as previously mentioned, is mounted at its four corners on wheels 12-15, each of which, including the tire thereon, is 36 inches (91.44 cm) in diameter. The structural and functional characteristics of the means by which the front end 11a of the vehicle body is mounted on the wheels 12 and 13 are generally similar to those of the means for mounting the rear end 11b of the vehicle body on the wheels 14 and 15, but they differ from one another in certain respects, as will now be described.

More particularly, as best shown in FIGS. 1-3 and 9-12, at both ends of the vehicle there are provided respective rocker frames 41 and 42 which are pivotally mounted on the front and rear torsion beams 18 and 19, for angular up and down movement about horizontal axes parallel to those beams, by means of pivot axles 43, 43a and 44, 44a associated with respective pairs of side arms 41a, 41b and 42a, 42b of the rocker frames and received in respective pairs of brackets 45, 46 and 47, 48 rigidly affixed to the torsion beams 18 and 19. The rocker frames 41 and 42, which support the axle means 49 and 50 for the two sets of wheels 12, 13 and 14, 15 at locations spaced, respectively, frontwardly and rearwardly of the torsion beams 18 and 19, are adapted to be angularly moved about their respective pivot axes by means of double-acting hydraulic piston and cylinder units 51 and 52 each having one end articulated at 51a or 52a to the associated rocker frame 41 or 42 and having its other end articulated at 51b or 52b to the associated post 32 or 33 adjacent the upper end of the same. The rocker frames are provided with internal stiffening plates or braces 41c, 41d and 42c, 42d, respectively, with the plates 41c and 42c being recessed at 41e, 42e to accommodate the end regions of the respective piston and cylinder units 51 and 52 connected to the pivot joints 51a and 52a. The stiffening plate 41d is additionally recessed at 41f.

Referring now to FIGS. 9-12 in particular, the axle means 49 and 50 comprise respective rotatable hubs 53 and 54 on which the wheels 12 and 13 are mounted and hubs 55 and 56 on which the wheels 14 and 15 are mounted. The hubs are rotatably supported by the respective housings 56, 57, 58 and 59 of four hydraulic motors 60, 61, 62 and 63 and are adapted to be driven, i.e., rotated, by the motors in either the forward or the reverse direction when fluid pressure is appropriately directed thereto, in a conventional manner not explicitly illustrated, via associated ones of the pipes or conduits 39. The pair of hub and motor units 53/56/60 and 54/57/61 are interconnected with each other by a tie rod 64 which is articulated to the motor housings 56 and 57 about vertical axes at 64a and 64b and by a link bar 65 which is articulated to the motor housings about vertical axes at 65a and 65b. The hub and motor units 55/58/62 and 56/59/63 are similarly interconnected by a tie rod 66 and a link bar 67 articulated at 66a, 66b and 67a, 67b. In each case the arrangement is such that the tie rod 64 or 66 is located closer to the respective lateral torsion beam 18 or 19 than is the associated link bar 65 or 67. In operation, fluid pressure appropriately directed by the operator to the linked front hub and motor units 53/56/60 and 54/57/61 and to the linked rear hub and motor units 55/58/62 and 56/59/63 activates the same to have the wheels 12, 13 and 14, 15 assume a desired angular position relative to the longitudinal axis of the vehicle; that position may be either parallel to the longitudinal axis, as shown in FIG. 11, or at an acute angle to either the right or the left relative to the longitudinal axis.

To the extent so far described, the front and rear wheel and axle arrangements are essentially identical to each other. They differ from one another, however, in the manner in which they are connected to the distal ends of the respective front and rear rocker frames 41 and 42. In the case of the front axle means 49 (see FIGS. 9-12), the same is pivotally connected with the rocker frame 41 for angular movement relative thereto about a horizontal axis perpendicular to the pivot axis 43-43a of the rocker frame. To this end, the link bar 65 of the axle means 49 is provided at its upper edge with a central lug or boss 68 (not explicitly shown in FIGS. 1-3) having a bore extending therethrough, and the rocker frame 41 is provided in its front end region with a pair of spaced, parallel brackets 69, 69a having respective coaxial bores extending therethrough. The boss 68 of the link bar 65 is located in the space between the brackets 69, 69a with its bore axially aligned with those in the brackets, and a suitable pivot bolt 70 is received in the aligned bores, the bolt being secured in place by nuts 70a or the like and the link bar being held in place by spacer sleeves 70b or the like. It will be apparent, therefore, that the recess 41f in the stiffening plate 41d serves to provide access to the inward side of the bracket 69 for facilitating assembly and disassembly of the axle means 49 and the rocker frame 41.

In the case of the rear axle means 50, on the other hand, the same is fixedly secured to the rocker frame 42. To this end, the link bar 67 at its upper edge is provided, at spaced locations thereon corresponding to the spacing between the side arms 42a and 42b of the rocker frame 42, with a pair of horizontal plates 71a, 71b, and the respective and regions of the side arms 41a, 41b of the rocker frame are rigidly secured, e.g., by welding, to the plates 71a, 71b. Alternatively, each of the plates 71a, 71b may be provided with two sets of holes (not shown) in the side regions thereof, and the ends of the side arms of the rocker frame may have correspondingly apertured foot plates secured thereto, with the same when abutted against the respective plates on the link bar then being secured to one another by bolts or rivets passed through the associated aligned holes.

When the vehicle is in use, therefore, it will be apparent from the foregoing that by a selective admission and/or release of pressure in the opposite ends of the cylinders 51 and 52, the vehicle body 11 can be raised relative to the wheels so as to lift the load-carrying frame section off the ground, as shown in FIG. 9 (which represents the in motion state of the vehicle), or the vehicle body can be lowered relative to the wheels so as to bring the frame section 16 to rest on the ground, as shown in FIG. 10 (which represents the stationary on-loading/off-loading state of the vehicle). It will also be apparent that one or both of the sets of wheels can be individually raised off the ground relative to the vehicle body, after the same has been lowered to the ground in the manner shown in FIG. 10, which would be effected by operating the appropriate piston and cylinder unit or units 51 and 52 somewhat past the state thereof illustrated FIG. 10 and would permit the performance, for example, of a tire or wheel changing or repair operation.

It should be understood, in this regard, that the possible extent to which the vehicle body can be raised as shown in FIG. 9 and hence the extent to which the load-carrying frame section 16 can be elevated off the ground depends on the lengths of the cylinders 51 and 52 and the stroke of the pistons therein. This arrangement, therefore, enables the vehicle body 11 to be elevated considerably more than heretofore known side-loading fork lift trucks, and as a consequence thereof the vehicle 10 according to the present invention is capable of being used on all types of terrain, even rocky or ridged as well as erose or rutted surfaces, in contrast to the known vehicles which are essentially intended for use only on flat, relatively smooth surfaces.

From the foregoing it will also be understood that the presence of the feet 18a and 19a on the lateral torsion beams 18 and 19 and the feet 20a and 21a on the transverse medial beams 20 and 21 serves several purposes. One of these, and clearly the primary one, is related to the fact that, as shown in FIGS. 1 and 1A, in the illustrated embodiment of the present invention the counterweight plates 40 and 40a are designed to be somewhat thicker than the lateral torsion beams, which is deemed desirable because it enables heavier counterweights to be placed on that side of the vehicle. The feet 18a, 19a thus enable such thicker counterweight plates to be used without the latter having to bear the weight of the vehicle 10 and the weight of the load (if any) supported by the vehicle when the vehicle body 11 thereof is lowered to the ground as shown in FIG. 10 (from which, for the sake of clarity, the counterweight plates 40, 40a have been omitted). At the same time, of course, the feet 20a, 21a on the beams 20 and 21 protect the latter, which (as will be described more fully hereinafter) constitute the guideway means for the trolley bearing the mast and the fork arms, by ensuring that they remain level with the lateral torsion beams and that the guide tracks for the trolley do not become bent or otherwise distorted under the weight of the counterweights and the trolley/mast/load combination.

Another purpose of the feet is that they enable the sought-for stability of the vehicle during on-loading and off-loading to be achieved even without the lateral torsion beams and the guide track beams having to be lowered into direct contact with the ground. Thus, even should the counterweight plates not be thicker than and thus not project below the undersides of the various beams, the presence of the feet on those beams protects the same from repeated impacts against the ground and especially protects the guide track flanges against distortions and deformations that might result from contacts with rocks, pieces of concrete, metal objects, and the like which happen to be lying on the ground where the vehicle comes to a stop for an on-loading or off-loading operation.

Figure 13A:
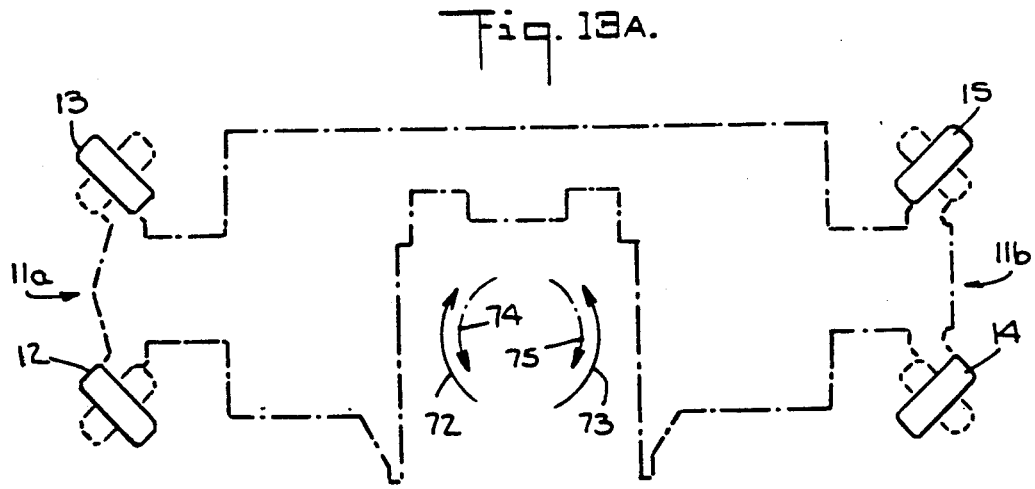
FIGS. 13A and 13B are diagrammatic representations of some of the various types of maneuvering movements which the side-loading fork lift vehicle according to the present invention can execute depending on the relative orientations of the front and rear ground wheels.
Figure 13B:
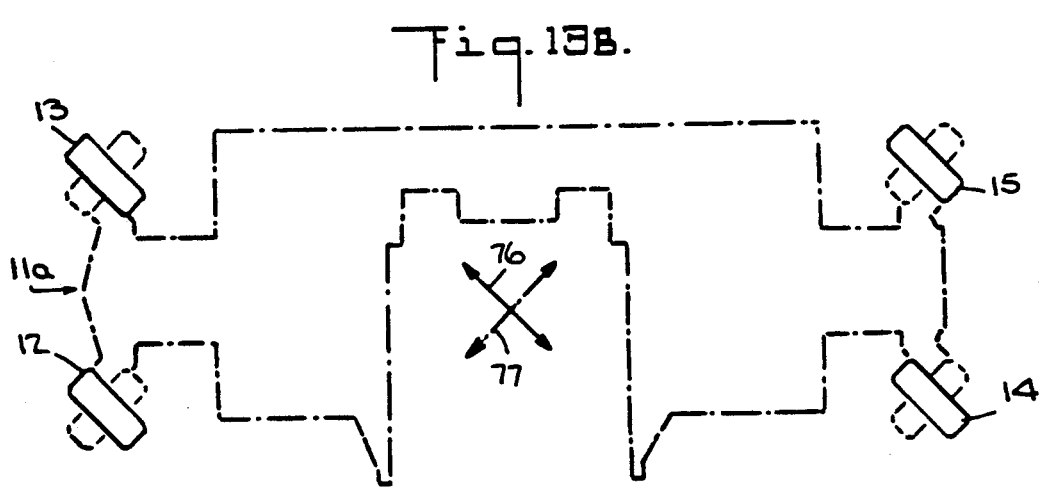

The various possible movements which the vehicle 10 according to the present invention can execute as a consequence of the above-described steering feature are diagrammatically represented in FIGS. 13A and 13B. With the four wheels all oriented parallel to the longitudinal axis of the vehicle, as shown in FIG. 11, the vehicle can be driven, in either forward or reverse, in the straight ahead mode. With the front wheels 12 and 13 turned in one direction (right or left) relative to the longitudinal axis of the vehicle and the rear wheels 14 and 15 turned in the opposite direction (left or right), as shown in solid and broken lines, respectively, in FIG. 13A, the vehicle can be driven in a radius turning mode, to the right in forward and to the left in reverse, as indicated by the solid-line arrows 72 and 73, or to the left in forward and to the right in reverse, as indicated by the broken-line arrows 74 and 75. With the four wheels all angled in the same direction (right or left) relative to the longitudinal axis of the vehicle, as shown in solid and broken lines in FIG. 13B, the vehicle can be driven in a crabwise mode or angled translation, to the right in forward as well as in reverse, as indicated by the solid-line double arrows 76, or to the left in forward as well as in reverse, as indicated by the broken-line double arrows 77.

Figure 12:
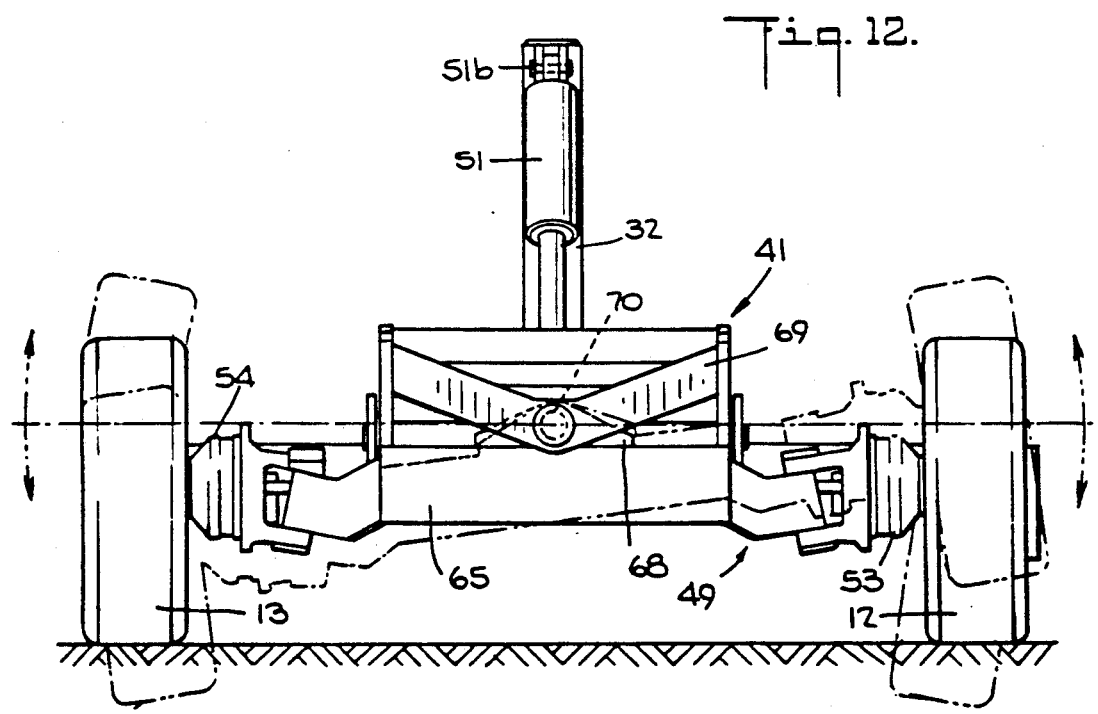
FIG. 12 is a fragmentary end elevational view of one end of the vehicle and illustrates the axle arrangement at that end which enables uneven terrain contours to be accommodated.

From a consideration of FIGS. 1, 9 and 12, the purpose of the pivotal connection of the axle means 49 to the rocker frame 41 will also be understood. If both axle means 49 and 50 were rigidly secured to their respective rocker frames in the manner of the illustrated connection between the axle means 50 and the rocker frame 42, then upon one of the wheels (it is immaterial which) at one end of the vehicle passing over a significant obstruction, i.e., either a relatively deep depression in or a relatively high elevation on the road surface, while the other wheel at the same end of the vehicle is rolling along an unobstructed (or at least a substantially less obstructed) section of the road surface, that end of the vehicle would assume a corresponding tilt, but the said other wheel would nevertheless remain in contact with the ground. At the other end of the vehicle, however, by virtue of the tilt of the vehicle body the wheel which is on the same side as the higher wheel at the first end would then be lifted off the ground, causing a potentially dangerous loss of ground contact, traction and stability. The pivotal mounting of the front axle means 49 on its rocker frame 41 effectively negates this risk, because the tendency of the vehicle body to tilt due to the change of level of the first wheel will increase the force on the potentially lower wheel at the other end and will cause the associated axle means to pivot in the opposite sense relative to the rocker frame thereof, as is diagrammatically shown in phantom outline in FIG. 12, so that the second wheel at the other end will automatically be constrained to remain in contact with the ground.

Reverting now to the frame section 16 of the vehicle body 11, the transverse medial beams 20 and 21 thereof, as previously mentioned, comprise the means for supporting and guiding the load-transferring mechanism 23 of the vehicle 10 according to the present invention. This mechanism includes a trolley or carriage 78 arranged for reciprocating movement along the beams 20 and 21, a vertically extendible mast 79 carried by the trolley together with piston and cylinder means 80 for elevating and lowering the mast, a pair of load-engaging fork arms 81 supported by the mast for movement therewith, piston and cylinder means 82 for moving the trolley reciprocally along the beams 20 and 21, and piston and cylinder means 83 for tilting the mast to a limited degree toward one side or the other of the vehicle relative to the vertical.

More particularly, the trolley 78, which may be a hollow grid-like frame structure composed of welded I-beams, box beams or the like, but in the illustrated embodiment of the invention has a generally H-shaped configuration with two parallel side frame members 78a and 78b (see FIGS. 1 and 2) and a medial transverse frame member 78c (see FIGS. 7 and 7A) all made of box beams welded to one another, is supported directly by the transverse beams 20 and 21. To this end, these beams, as best shown in FIGS. 1 and 2, are open-ended and sideways open channel-shaped structures the upper and lower webs or flanges 20b/20c and 21b/21c of which define a pair of guideways or tracks. At the opposite ends of each of the side frame members of the trolley are journaled the axles of a respective pair of rollers 84 and 85, the rollers being received between the upper and lower flanges of the respective guide tracks and being in rolling contact with, i.e., riding on, the lower flanges 20c and 21c.

It should be noted that although this arrangement is currently preferred for mounting the trolley on the guide tracks, an arrangement of rollers like that shown in application Ser. No. 342,999 could also be used. In that arrangement, as shown diagrammatically in FIG. 4A, the trolley is provided with a respective set of two pairs of rollers or wheels 86, 87 at each side frame member of the trolley. The rollers in each set are staggered with respect to each other, with the axes of the rollers 86 being disposed somewhat lower than those of the rollers 87, and on each side the lower rollers are in rolling contact with and run along only the respective lower beam flanges 20c and 21c while the upper rollers are in rolling contact with and run along only the upper beam flanges 20b and 21b.

The mast 79 (FIGS. 1, 2 and 6) includes a primary framework consisting of a pair of substantially vertical parallel guide beams 88 which are rigidly interconnected with each other in their upper regions by a plurality of transverse tie brackets 89 and are tiltably connected at their lower regions by pivot means 90, to be more fully described presently, to a pair of spaced upright brackets 91 rigidly affixed to the trolley. The two piston and cylinder units which constitute the piston and cylinder means 83 are articulated at one end thereof to a pair of ears or lugs 92 projecting from the respective guide beams 88 and at the other end (see also FIG. 8) to a pair of ears or lugs 93 projecting from a cross-bar 94 fixed to and extending between the upper ends of the upright brackets 91. The arrangement is such that, taking into account the angle between the piston and cylinder units 83 and the guide beams 88 as well as the stroke of the pistons of the piston and cylinder units 83, the primary framework of the mast may be tilted toward the on-load/off-load side of the vehicle about 10° off the vertical and toward the opposite side about 5° off the vertical.

Slidably mounted within the primary mast framework is a secondary rectangular framework consisting of a pair of substantially vertical parallel beams 95 which are rigidly interconnected with each other at their top and bottom ends by respective cross beams 96 (only the top one is shown) and are slidably arranged within the primary framework constituted by the guide beams 88. For the sake of simplicity, the beams 88 and 95-96 are illustrated as having the form of flat bars, but in the preferred embodiment of the present invention the beams 88 are channel-shaped beams of U-shaped cross-section with the channels being open to the inside of the framework, while the beams 95 are I-beams slidably guided for longitudinal movement within the channels of the beams 88. The cross beams 96 preferably are likewise I-beams, although this is not indispensable. Mounted in the primary framework of the mast is a vertical cylinder 97 of the hydraulic piston and cylinder means 80, the piston rod 98 of which extends upwardly out of the cylinder and is connected at its free end to the center of the upper cross beam 96 of the secondary mast framework at 96a. Supported by the secondary framework beams 95 at their inside faces just below the upper cross beam 96 at opposite sides of the piston rod connection are a pair of axles or hubs 99a which rotatably support respective sprocket wheels or pulleys 99 about which are trained respective sprocket chains 100. Each of the chains 100 is anchored at one end to the trolley 78 at 78d (FIG. 6).

At their other ends, the chains 100 are anchored, respectively, to a pair of adjuncts (not shown) of a first vertical plate 101 located at the on-load/off-load side of the secondary mast framework and slidably guided by the vertical beams 95 thereof during its up and down movements relative to the beams 95 with the chains 100 as the mast is raised and lowered by the piston and cylinder means 80. The plate 101 is provided in its upper and lower regions with four openings located symmetrically to the mast cylinder 97 (see FIG. 8) and on its side facing the torsion beam 17 carries four guide bushings 102 each axially each aligned with a respective one of the openings in the plate. Slidably extending through the aligned bushings and openings are four guide rods 103, with the ends of the rods which are located on the on-load/off-load side of the plate 101 being connected to and supporting a second vertical plate 104. The plate 104 serves as the means for supporting the fork arms 81, for which purpose the vertical leg 81a of each of the fork arms is provided at the upper end region of its back face with a respective welded-on or otherwise integral downwardly angled L-shaped rigid hook member 81b so dimensioned that the top edge of the plate 104 is received in the recess of the underside of the hook member with a tight frictional fit. If desired, the top edge of the plate 104 may be provided with a series of notches (not shown) to aid in firmly securing the fork arms to the plate at a variety of laterally adjusted positions.

Figure 6:
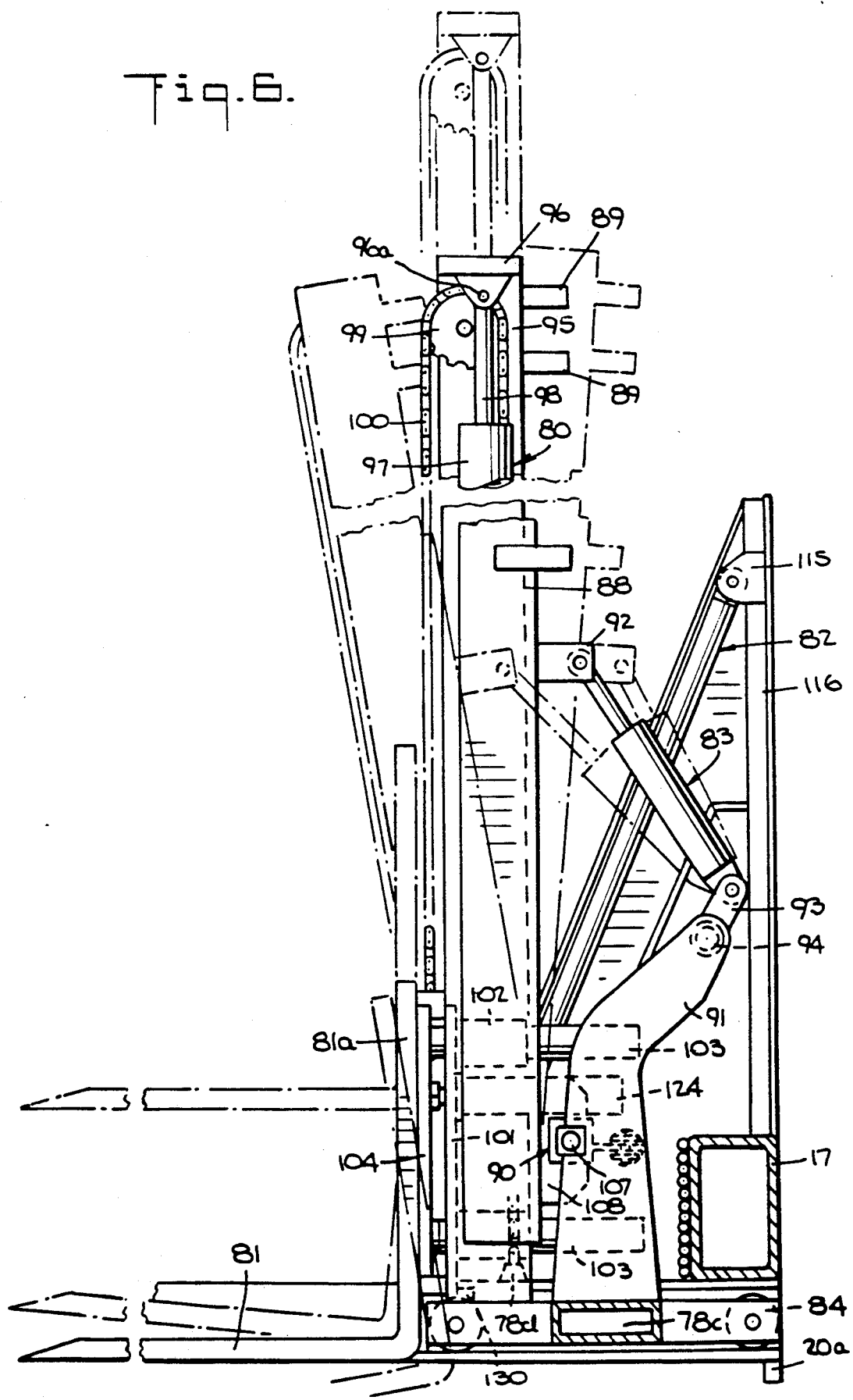
FIG. 6 is an elevational view, taken along the line 6—6 in FIG. 2, which illustrates the mast and the framework thereof and also shows the mechanism for minimally tilting the same relative to the vertical toward one side or the other of the vehicle.

It will be understood, therefore, that when the piston and cylinder means 80 are extended, the secondary mast frame 95-96 is elevated out its lowermost rest position shown in solid lines in FIGS. 1 and 6 into a position such as is shown in phantom outline in FIG. 6, as a consequence of which the fork arms 81 are likewise elevated out of their lowermost rest position. It will further be understood that by virtue of the presence of the pulley and chain combinations 99-100, during any up or down movement of the mast frame 95-96, the fork arms actually will travel a distance approximately double that of the stroke of the piston of the piston and cylinder means 80. Thus, the fork arms will reach their maximum elevation adjacent the top end of the mast frame at the same time that the latter reaches the limit of its upward movement, and vice versa.

Figure 7:
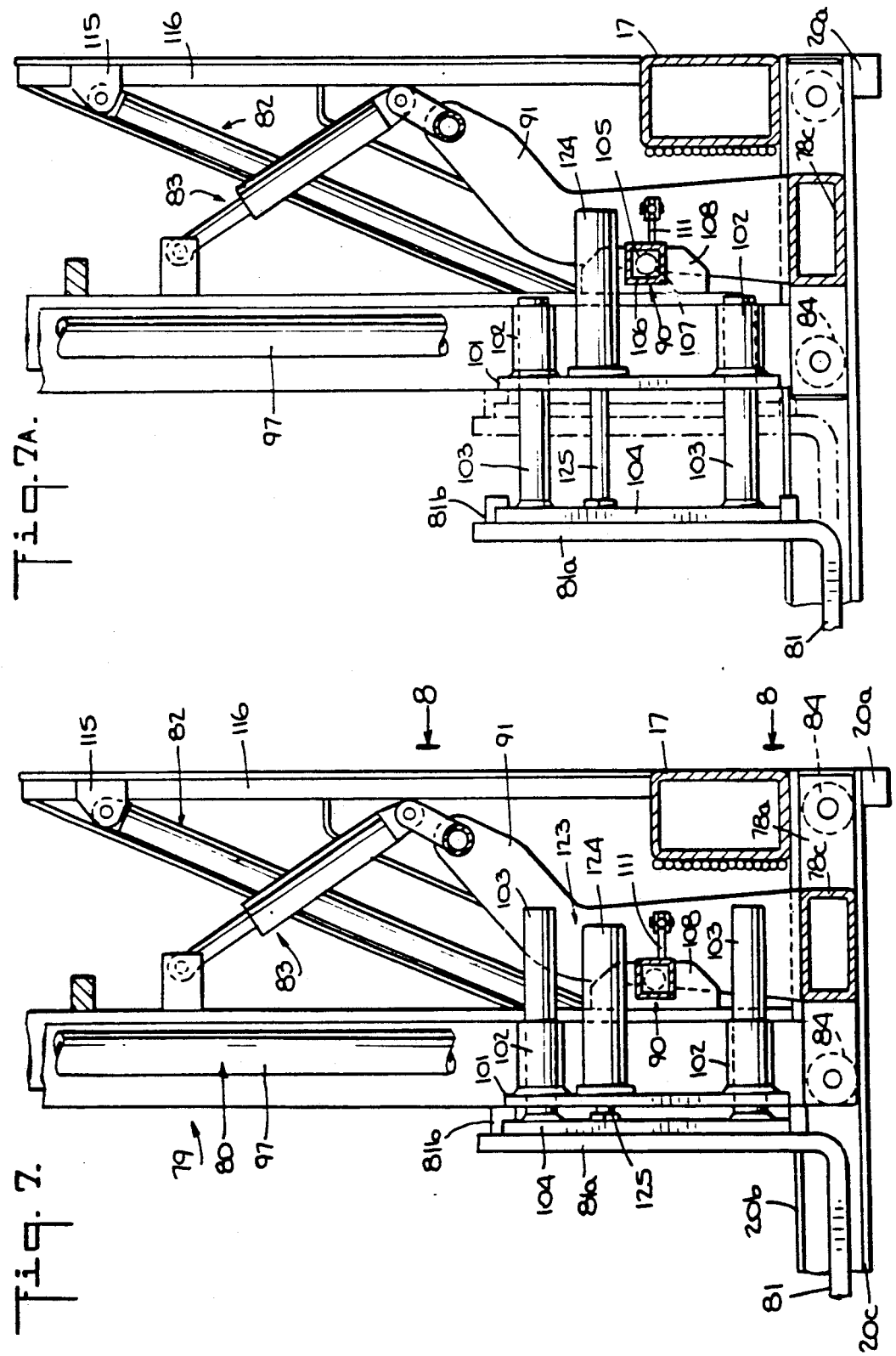
FIG. 7 is an elevational view, taken along the line 7—7 in FIG. 2, which illustrates details of the arrangements for pivotally mounting the mast on the trolley, for mounting the fork arms on the mast, and for shifting the fork arms a short distance outwardly relative to the trolley, with the fork arms being shown in their normal position on the trolley.
Figure 8:
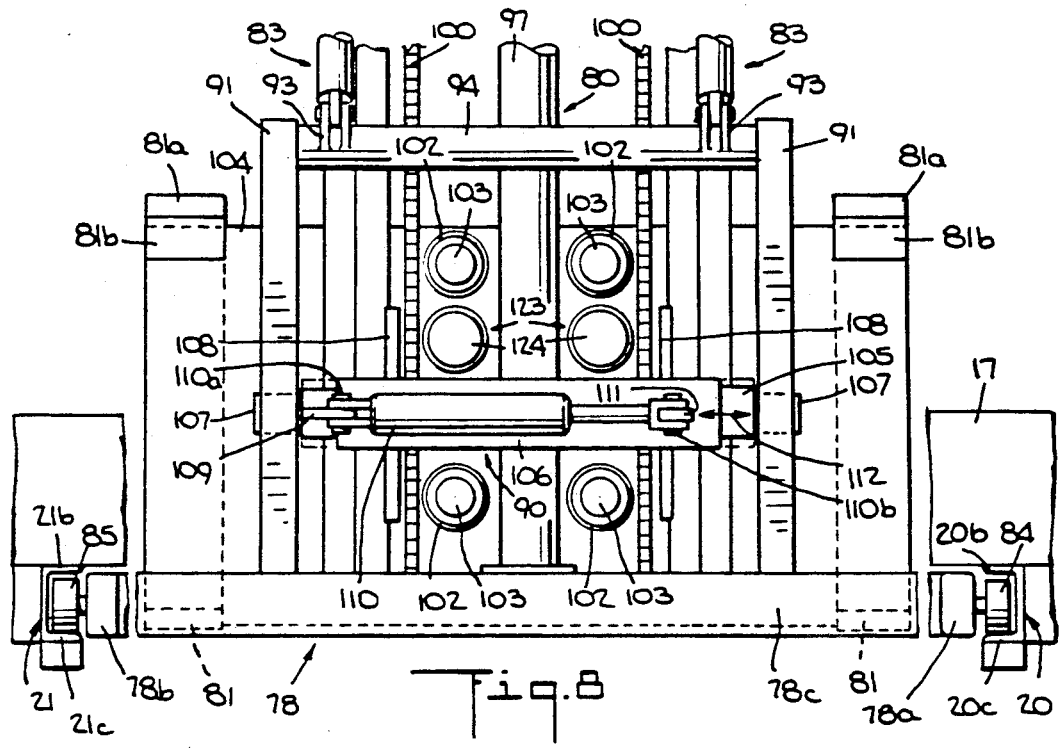
FIG. 8 is a fragmentary elevational view taken along the line 8—8 in FIG. 7, with some parts being broken away for the sake of clarity.

The means 90 for pivotally supporting and laterally displacing the mast 79 on the trolley 78 are best shown in FIGS. 7 and 8. The means 90 includes a horizontal steel rod 105 which is located between the upright brackets 91 and the main body of which is of square cross-section, and a tubular steel sleeve 106 the interior axial bore of which is likewise of square cross-section, with the rod being smoothly slidably received in the sleeve. The rod 105 has a pair of trunnions or extensions 107 of circular cross-section projecting axially of the rod from its opposite ends, which trunnions are rotatably journaled in the brackets 91 through the intermediary of suitable heavy-duty bearings or journals (not shown). The sleeve 106 is rigidly affixed intermediate its ends to a pair of vertical support plates or brackets 108 which in turn are rigidly affixed to the vertical beams 88 of the primary framework of the mast. In the illustrated embodiment of the invention, the cross-sectional thickness of the square body of the rod 105 is about 4 inches (10.16 cm), the wall thickness of the sleeve 106 is about 0.5 inch (1.27 cm), the diameter of the trunnions 107 is about 3.5 inches (8.89 cm), and the thickness of the brackets 91 is about 1 inch (2.54 cm), by virtue of which the means 90 has the strength to support the mast 79 and any reasonably anticipated load which may be carried thereby.

Referring further to FIG. 8 (see also FIG. 3), rigidly affixed to one of the upright brackets 91 is a horizontal bracket 109 to which is articulated at 110a one end of a double-acting hydraulic piston and cylinder unit 110 the other end of which is articulated at 110b to a horizontal bracket 111 which is rigidly affixed to and projects from the exterior of the sleeve 106. It will be apparent, therefore, that by suitably actuating the piston and cylinder unit 110 in one sense or the other, the sleeve 106 can be axially shifted a relatively short distance along the rod 105 in one direction or the other, as indicated by the double arrow 112 in FIG. 8. Any such movement of the sleeve will, consequently, entail a corresponding lateral shift of the entire mast and therewith of the fork arms 81, and it will be further apparent that such a shift of the fork arms may be desirable and used when the vehicle 10 has been brought to a stop in front of a given tier of compartments of a storage rack and the operator finds it necessary and wishes, without first having to restart and move the entire vehicle, to compensate for a small misalignment of the fork arms vis-a-vis the compartment from or to which a load is to be transferred.

Referring now to FIGS. 1, 4 and 6, the reciprocal movements of the trolley 78 and the mast 79 outwardly and inwardly of the load-carrying frame section 16 in the directions of the double arrows 113 is effected, in accordance with one embodiment of the present invention, through the intermediary of the piston and cylinder means 82. As best shown in FIG. 4 (see also FIG. 3), each of the piston and cylinder units 82 is articulated at one end to a respective bracket 114 rigidly affixed to the associated one of the side frame members 78a and 78b of the trolley 78. At its other end, each of the piston and cylinder units 82 is articulated to a respective bracket 115 rigidly affixed to an associated part of a stanchion or like adjunct 116 of the main torsion beam 17. Thus, upon appropriate admission of pressure into one end (the upper end in FIG. 4) of each of the cylinders 117 of the piston and cylinder units 82, the latter are extended from their short state shown in solid lines in FIGS. 4 and 6 to their elongated state shown in phantom outline in FIG. 6, by virtue of which the trolley 78 is shifted from its position adjacent the torsion beam 17 to its position at the opposite side of the vehicle, whereby the fork arms 81 are shifted from their retracted position within the confines of the vehicle body 11 to their protracted position outside the same. The reverse takes place, of course, when pressure is admitted into the lower ends of the cylinders 117 of the piston and cylinder units 82.

It will be understood, in this regard, that in the case of such an arrangement of the piston and cylinder units, i.e., where they are connected directly between the trolley and the main torsion beam or an adjunct thereof, the movements are relatively slow and the cylinders must be long enough to permit a piston stroke sufficient to cover the entire extent of travel of the trolley. Accordingly, in order to enable the trolley movement to be speeded up and to enable the cylinder length to be materially reduced, it is contemplated by the present invention to provide an alternate mechanism 82' (see FIG. 5) for moving the trolley. As there shown, the mechanism 82' comprises a linkage system including, for each side of the trolley, a crank arm link or lever 118 the free end of the longer arm of which is articulated at 118a to the beam 17 and the free end of the shorter arm of which is articulated at 118b to one end of a straight arm link or lever 119 the other end of which is articulated at 119a to the associated side frame member 78a or 78b of the trolley 78. The mechanism 82' further comprises respective piston and cylinder means 120 each of which includes a double-acting hydraulic cylinder 121 having one end articulated at 121a to the link arm 118 intermediate the opposite ends thereof, and a piston rod 122 projecting from the other end of the cylinder and having its free end articulated at 122a to the link arm 119 intermediate the opposite ends of the latter. The mechanical advantage afforded by the linkage system 118-119 and the piston and cylinder means 120 connected therewith, as well as the manner in which they enable the above-mentioned objectives of increasing the speed of movement of the trolley and reducing the length of the cylinder to be achieved, will be readily understood by those skilled in the art and hence need not be further described herein.

Reverting now to FIGS. 7, 7A and 8, in accordance with an optional aspect of the present invention the fork arm supporting means 101/104 etc. is also equipped with double-acting hydraulic piston and cylinder means 123 for shifting the fork arms 81 in a horizontal direction relative to the mast 79 and the trolley 78. To this end, the piston and cylinder means 123 include two cylinders 124 which are rigidly affixed to the vertical plate 101 intermediate the upper and lower guide bushings 102 at the side of the plate directed toward the main torsion beam 17 and in symmetrical relation to the mast cylinder 97. The piston rods 125 which project from the cylinders 124 extend slidably through respective openings in the plate 101 and at their distal ends are connected (either fixedly or in an articulated fashion) to the vertical plate 104. The length of the cylinders 124 is sufficient to provide a piston stroke of about 12 inches (30.5 cm). It will be apparent, therefore, that the provision of the piston and cylinder means 123 in conjunction with the sliding guide rod and bushing means 102/103 for mounting the fork arms 81 on the mast enables the fork arms, upon the trolley having reached the end of its extent of travel along the guide tracks 20/21 toward the on-load/off-load side of the vehicle, to be extended about a foot (30-35 cm) or so beyond what would otherwise be their most protracted position. It will also be apparent that such an added extension of the fork arms may be desirable and used when the vehicle has been brought to a stop in front of a given tier of compartments of a storage rack and the operator finds it necessary and wishes, without first having to restart and move the entire vehicle, to compensate for having come to a stop a bit too far from the compartment from or to which a load is to be transferred.

The advantages of the side-loading fork lift vehicle 10 according to the present invention, including those already adverted to hereinbefore as well as others, may best be summarized with reference to FIG. 14 which illustrates a junked or wrecked car storage facility equipped with a large number of multilevel storage racks 126 having limited vertical clearance between successive levels 126a, 126b and 126c and having the next adjacent racks 126' and 126" separated from each other by a relatively narrow aisle 127 about 10-11 feet (3.05-3.35 meters) wide. It will be readily apparent from the foregoing description that in the absence of the radius turn mode front and rear wheel steering system of the present invention, the vehicle 10, which (with the tires included) is about 27.5 feet (8.38 meters) long and about 9.8 feet (2.99 meters) wide at its fork lift section, would ordinarily not be maneuverable into the aisle 127 from a perpendicularly running aisle. The steering capabilities of the vehicle 10 thus constitute a major advantage of the present invention, especially when considered in light of the fact that the same steering capabilities, with the center of gravity of the vehicle being located between the wheels when the trolley is retracted, also enable the vehicle body to have a relatively narrow 6-foot wide wheel base, which is far less than that of known side-loading fork lift trucks designed for handling heavy loads which are long relative to their width. Moreover, once in the aisle 127 the vehicle can be easily maneuvered closer to the rack 126', from one of the levels of which a car is to be removed, by utilizing the crab mode steering as needed. This capability is, of course, further enhanced by the location of the operator's cab, which permits him to gauge the location of either side of the vehicle relative to the proximate rack section with great accuracy.

Assuming that the car 128 in the lowest level 126a of the rack 126' is to be removed, the vehicle 10 is brought to a halt at the appropriate location. The operator then first activates the piston and cylinder units 51 and 52 to lower the load-carrying frame section 16 down onto the ground, and then the piston and cylinder means 82 (FIG. 4) or 120 (FIG. 5) to move the trolley 78 outwardly of the vehicle body along the transverse guide rail beams 20 and 21 so as to protract the fork arms 81 into position under the car body 128. It should be noted, in this regard, that when the rocker frames 41 and 42 are elevated by the piston and cylinder means 51 and 52 to lower the load-carrying frame section 16 to the ground, the rocker frame 42 engages a limit switch member 129 (see FIGS. 9 and 10) which activates an interlock in the hydraulic and electrical systems and prevents any movement of the vehicle.

To facilitate entry of the fork arms under the car body, the mast 79 is tilted forwardly a bit relative to the vertical by the piston and cylinder means 83 (FIG. 6). If the forks turn out not to be fully aligned with the car body, the operator can first briefly interrupt the forward movement of the trolley and operate the piston and cylinder means 110 (FIG. 8) to shift the mast laterally a few inches, i.e., toward the front end 11a or the rear end 11b of the vehicle, to achieve the proper positioning of the forks. By the same token, if the protracted position of the fork arms turns out to be somewhat short of the optimum position for safely engaging and lifting the car body off its rack, the operator can, after having fully advanced the trolley to the end of its guide track, operate the piston and cylinder means 123 to shift the fork arms outwardly a bit relative to the trolley and without moving the latter to achieve the proper positioning of the forks.

Once the forks are under the car, the operator first activates the piston and cylinder means 83 to reverse the inclination of the mast and to tilt it a bit in the other direction (FIG. 6) relative to the vertical. He then raises the secondary mast frame 95-96 a few inches, by extending the piston and cylinder means 80, to lift the car 128 off the rack supports 126a just enough to clear those and the platform surfaces of the load-carrying frame section, and activates the piston and cylinder means 82 or 120 to retract the trolley and the forks into the confines of the vehicle body 11.

When the trolley is fully retracted, and assuming the car is to be transferred to another rack, the operator reverses the previous activation of the piston and cylinder means 80 and lowers the mast so as to bring the car to rest on the platform-defining plates 30 and 31. He then activates the piston and cylinder units 51 and 52 to raise the vehicle frame section 16 off the ground, which releases the switch member 129 and the anti-movement interlocks, and proceeds to the assigned location (if need be, of course, first steering the vehicle away from the rack 126', for example, in the crabwise mode), where he will deposit the car 128 by first lowering the frame section 16 to the ground and then operating the mast and the trolley (in the manner already described) as needed. It should be noted here that the vehicle also is equipped with a limit switch 130 (see FIG. 6) mounted on the primary framework of the mast and having a switch member engageable with the bottom of the secondary mast framework or an adjunct thereof, the function of which is to prevent any movement of the vehicle when the mast is elevated by the piston and cylinder unit 80.

If, alternatively, the car 128 is merely to be transferred to a higher level in the same rack column, for example, into the empty rack section 126c shown in FIG. 14, the operator merely activates the piston and cylinder means 80 to raise the mast 79, and therewith the car 128 retained on the fork arms 81, to the position thereof opposite the rack section 126c, as indicated in phantom outline in FIG. 14 at 128'. He then activates first the piston and cylinder means 82 or 120 to advance the trolley along its guide track and therewith the mast 79 to dispose the car over the rack supports, thereafter the piston and cylinder means 80 to lower the mast frame 95-96 so as to lower the car onto the rack supports, then the piston and cylinder means 82 or 120 again to fully retract the trolley and also to retract the fork arms from under the car, and finally the piston and cylinder means 80 to lower the mast frame to its FIG. 1 position.

There are some additional advantages of the present invention of which note should be taken here. One is that the operator is able to take a car disposed at ground level and bring it into the confines of the frame section 16 of the vehicle 10, and vice versa, without ever having to elevate the fork arms off ground level (except, of course, for the minimal elevation required for achieving a clearance between the bottom of the car and the ground). In the known side-loading fork lift trucks having raised platforms for supporting on-loaded objects, this advantage is clearly not achievable. Moreover, such known trucks must be provided with special counter-balancing, stabilizing and load distribution means during on-loading and off-loading, because of the fact that the use of such raised platforms requires the load to be lifted to a substantial elevation away from the center of gravity of the truck before it can be deposited on a receiving surface, either the ground or the platform or a stack.

In the fork lift vehicle of the present invention, it will be noted, the lowering of the frame section 16 to rest flat on the ground during on-loading and off-loading, which had not been known or used prior to the invention described and claimed in the prior application Ser. No. 342,999, imparts to the vehicle 10 a degree of stability not achieved in the known side-loading fork lift trucks. Thus, the need for using outriggers or other special stabilizing and load distribution means has been effectively obviated. By virtue of this feature, furthermore, the vehicle 10 of the present invention can be adapted to lifting heavy loads such as junked or wrecked cars to and from heights of as much as 30-35 feet (9.14-10.67 meters), which requires only the provision of a multi-section (e.g., a double or triple extension) telescoping mast.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims. Merely by way of example, although the vehicle 10 has been described as having the tiltably interconnected axle means 49 and rocker frame 41 at the front end of the vehicle, such tiltable axle means and rocker frame combination can equivalently be located at the rear end of the vehicle, i.e., under the operator's cab 37. Also, the torsion beams 17, 18 and 19 need not necessarily be square or rectangular in cross-section as shown, but can be constructed in either configuration as design criteria dictate. Still further, certain features such as the crab steering capability and the sideways adjustability of the mast and the extra fork extension capability are optional and can be omitted, and the precise location and make-up of the operator's cab can be other than as shown. Many other variations will readily suggest themselves to those skilled in the art.

We claim:

1. A side-loading fork lift vehicle for handling a heavy load which is long relative to its width, said vehicle comprising:

a. an elongated vehicle body having front and rear ends and opposite sides, said vehicle body including an elongated load-carrying frame section which includes (i) first torsion beam means extending longitudinally of said vehicle body at one side and from said front end to said rear end thereof, (ii) second and third torsion beam means located at said front end and said rear end of said vehicle body, respectively, and each extending from said one side of said vehicle body to the other side of the latter, with each of said second and third torsion beam means being rigidly affixed at a first end of the same to said first torsion beam means at said one side of said vehicle body and having a second end located substantially at said other side of said vehicle, (iii) a pair of parallel transverse beam means located in the midregion of said frame section and defining a first space therebetween, with each of said transverse beam means being rigidly affixed at a first end of the same to said first torsion beam means at said one side of said vehicle body and having a second end located substantially at said other side of said vehicle body, and said transverse beam means being separated by respective second and third spaces from said second and third torsion beam means, and (iv) respective cross-brace means located in said second and third spaces and being rigidly affixed to the associated one of said second and third torsion beam means and the proximate one of said transverse beam means;

b. front axle means supporting a pair of front ground wheels, rear axle means supporting a pair of rear ground wheels, front rocker frame means pivotally connected to said second torsion beam means for angular up and down movement about a first axis parallel to the latter and supporting said front axle means at a position spaced from and located frontwardly of said second torsion beam means, rear rocker frame means pivotally connected to said third torsion beam means for angular up and down movement about a second axis parallel to the latter and supporting said rear axle means at a position spaced from and located rearwardly of said third torsion beams means, and respective hydraulic piston and cylinder units articulated each between one of said second and third torsion beam means and the associated one of said front and rear rocker frame means, said hydraulic piston and cylinder units being operable to elevate said load-carrying frame section relative to said wheels and away from the ground when the vehicle is to be in motion and being operable to lower said load-carrying frame section relative to said wheels and to the ground when the vehicle is to be stationary during an on-loading or off-loading operation;

c. respective motor means for driving said front and rear ground wheels in forward and reverse, and means for controlling the orientations of said front and rear ground wheels through respective arcs to either the left or the right relative to the longitudinal axis of said vehicle body for enabling movement of the vehicle at least in either a straight ahead mode or a radius turning mode in either the forward or the reverse direction;

d. guideway means on said transverse beam means and extending along the latter, a trolley located in said first space and mounted on said guideway means for reciprocal movement therealong, and first hydraulic piston and cylinder means operatively interconnected between said load-carrying frame section and said trolley for reciprocally moving the latter along said guideway means;

e. load-handling means arranged on said trolley and including a vertical framework carried by said trolley, mast means mounted in said framework for vertical up and down movement relative thereto, second hydraulic piston and cylinder means operatively interconnected between said trolley and said mast means for moving the latter up and down relative to said framework and said trolley, and a plurality of fork arms carried by said mast means and extending therefrom in a direction away from said one side of said vehicle body, said fork arms being adapted, upon an appropriate movement of said trolley, to be retracted to a position within the confines of said load-carrying frame section or protracted to a position outside the confines of said load-carrying frame section beyond said other side of said vehicle body; and f. an operator's cab mounted on said vehicle body, said cab being supported by said torsion beam means at an elevation above the level of said load-carrying frame section.

2. A side-loading fork lift vehicle as claimed in claim 1, further comprising interlock means for inhibiting movement of the vehicle either when said piston and cylinder units are activated to lower said load-carrying frame section to rest on the ground or when said second piston and cylinder means are activated to elevate said mast means and said fork arms relative to said trolley and said framework.

3. A side-loading fork lift vehicle as claimed in claim 1, wherein said guideway means comprises upper and lower parallel flanges on each of said transverse beam means at the respective sides thereof facing toward one another, the associated upper and lower flanges defining respective guide tracks, and the means for mounting said trolley on said guideway means comprises roller means carried by said trolley on the opposite sides thereof and disposed within the confines of said guide tracks, said roller means being in rolling contact with at least said lower flanges.

4. A side-loading fork lift vehicle as claimed in claim 3, means comprising two rollers on each side of said trolley, each of said rollers being in rolling contact with the associated lower flange.

5. A side-loading fork lift vehicle as claimed in claim 3, wherein said roller means comprises four rollers on each side of said trolley, two of said rollers on each side of said trolley being in rolling contact with only the associated lower flange, and the other two of said rollers on each side of said trolley being in rolling contact with only the associated upper flange, with each two lower flange-contacting rollers being in staggered relation to and in an alternating sequence with the associated two upper flange-contacting rollers.

6. A side-loading fork lift vehicle as claimed in claim 1, wherein said first piston and cylinder means are articulated directly between said first torsion beam means and said trolley for effecting the movements of the latter along said guideway means.

7. A side-loading fork lift vehicle as claimed in claim 1, further comprising scissors-type linkage means articulated between said trolley and said first torsion beam means, said first piston and cylinder means being articulated between different elements of said linkage means for exerting forces thereon to move said trolley along said guideway means.

8. A side-loading fork lift vehicle as claimed in claim 6 or 7, further comprising first vertical support plate means rigidly affixed to said mast means, horizontal guide rod means slidably carried by and extending through said first support plate means, second vertical support plate means located at the side of said first support plate means which is directed away from said mast means and said framework and toward said other side of said vehicle body, said second support plate means being rigidly affixed to said guide rod means for translational movement relative to said first support plate means, said fork arms being carried by said second support plate means, and third hydraulic piston and cylinder means operatively interconnected between said first and second support plate means for reciprocally moving said second support plate means to a limited extent relative to said trolley and for thereby enabling a limited additional shifting said fork arms outwardly of said vehicle body upon said trolley having reached the limit of its outward travel along said guideway means.

9. A side-loading fork lift vehicle as claimed in claim 8, wherein said fork arms are removably carried by said second support plate means for enabling selective removal, replacement or lateral shifting of any given one or more of said fork arms.

10. A side-loading fork lift vehicle as claimed in claim 1, further comprising means pivotally mounting said framework on said trolley, and fourth hydraulic piston and cylinder means articulated between said trolley and said framework for selectively tilting the latter and thereby also said mast means and said fork arms laterally of said vehicle body in one direction or the other relative to the vertical.

11. A side-loading fork lift vehicle as claimed in claim 10, further comprising a pair of upstanding bracket means rigidly affixed to said trolley at spaced locations substantially corresponding to the width of said framework, and laterally oppositely extending pivot axle means connected with said framework and journaled in said bracket means for pivotally mounting said framework on said bracket means, said fourth piston and cylinder means being articulated between said bracket means and said framework.

12. A side-loading fork lift vehicle as claimed in claim 11, further comprising slide means including an elongated bar having a body of square cross-section and an elongated sleeve having a longitudinally extending bore of square cross-section therein, said sleeve being rigidly affixed to said framework and said body of said bar being slidably received in said bore of said sleeve, said bar being provided at its opposite ends with a pair of coaxial extensions of circular cross-section constituting a pair of pivot axles, said bracket means being provided with a respective pair of bearings rotatably receiving said pivot axles, and fifth hydraulic piston and cylinder means articulated between said sleeve and one of said bracket means for selectively displacing said sleeve axially of said bar and for thereby shifting said framework with said mast means and said fork arms linearly reciprocally in a direction transverse to the direction of movement of said trolley along said guideway means and relative to an on-loading or off-loading location in the event of a slight misalignment between said fork arms and said on-loading or off-loading location in the stopped position of the vehicle.

13. A side-loading fork lift vehicle as claimed in claim 1, further comprising slide means mounting said framework on said trolley for limited linear reciprocal movement transverse to the direction of movement of said trolley along said guideway means, and fifth hydraulic piston and cylinder means articulated between said trolley and said framework for selectively shifting the latter and thereby also said mast means and said fork arms laterally relative to an on-loading or off-loading location in the event of a slight misalignment between said fork arms and said on-loading or off-loading location in the stopped position of the vehicle.

14. A side-loading fork lift vehicle as claimed in claim 1, wherein said hydraulic piston and cylinder units, upon the same having been operated to lower said load-carrying frame section to rest on the ground, are further operable individually or jointly to pivot their associated rocker frame means upwardly so as to elevate the associated wheel axle means and so as to raise the respective ground wheels mounted thereon off the ground for enabling repair or replacement of those ground wheels or of the tires constituting parts thereof.

15. A side-loading fork lift vehicle as claimed in claim 1, wherein said operator's cab is centered relative to said vehicle body at said rear end of the latter, thereby to position the operator, during operation of the vehicle, so as to have a good view of both sides of said vehicle body.

16. A side-loading fork lift vehicle as claimed in claim 1, further comprising respective counterweight means each located between and being rigidly affixed to a respective one of said transverse beam means and the proximate one of said second and third torsion beam means at the regions of said second ends of those beam means.

17. A side-loading fork lift vehicle as claimed in claim 1 or 16, further comprising respective plates each supported by and being rigidly affixed to the top surfaces of a respective one of said transverse beam means and the proximate one of said second and third torsion beam means and overlying the respective second and third spaces and the associated cross-brace means between those beam means to define respective load-supporting platform sections.

18. A side-loading fork lift vehicle as claimed in claim 1, wherein each of said torsion beam means comprises a beam which is a hollow structure of rectangular or square cross-section.

19. A side-loading fork lift vehicle as claimed in claim 1, wherein one of said front and rear axle means is rigidly affixed to the associated one of said front and rear rocker frame means, and the other axle means is pivotally connected to its associated rocker frame means for angular movement relative to the latter about a third axis arranged to be perpendicular to said first and second axes and to extend longitudinally of said vehicle body when said hydraulic piston and cylinder units are operated to elevate said load-carrying frame section away from the ground for motion of the vehicle.

* * * * *